US010251155B2

(12) United States Patent
Gupta et al.

(10) Patent No.: US 10,251,155 B2
(45) Date of Patent: Apr. 2, 2019

(54) TECHNIQUES FOR MULTICAST WIRELESS COMMUNICATIONS

(71) Applicant: QUALCOMM Incorporated, San Diego, CA (US)

(72) Inventors: Ajay Gupta, San Diego, CA (US); Jun Wang, Poway, CA (US); Miguel Griot, La Jolla, CA (US); Ozcan Ozturk, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 176 days.

(21) Appl. No.: 15/398,891

(22) Filed: Jan. 5, 2017

(65) Prior Publication Data

US 2017/0201964 A1 Jul. 13, 2017

Related U.S. Application Data

(60) Provisional application No. 62/276,664, filed on Jan. 8, 2016.

(51) Int. Cl.
*H04W 74/08* (2009.01)
*H04W 72/00* (2009.01)
(Continued)

(52) U.S. Cl.
CPC ......... *H04W 72/005* (2013.01); *H04L 12/189* (2013.01); *H04W 4/06* (2013.01);
(Continued)

(58) Field of Classification Search
None
See application file for complete search history.

(56) References Cited

U.S. PATENT DOCUMENTS

| 8,913,538 | B2* | 12/2014 | Lee | ............... | H04W 28/06 |
| | | | | | 370/310 |
| 2004/0037237 | A1* | 2/2004 | Lalwaney | ........ | H04J 13/0048 |
| | | | | | 370/320 |

(Continued)

FOREIGN PATENT DOCUMENTS

WO WO-2014/183279 A1 11/2014

OTHER PUBLICATIONS

"3rd Generation Partnership Project; Technical Specification Group Radio Access Network; Introduction of the Multimedia Broadcast/ Multicast Service (MBMS) in the Radio Access Network (RAN); Stage 2 (Release 12)" 3GPP Draft; 25346-000, 3rd Generation Partnership Project (3GPP), Mobile Competence Centre; 650, Route Des Lucioles; F-06921 Sophia-Antipolis Cedex; France, Mar. 17, 2014 (Mar. 17, 2014), XP050916586, Retrieved from the Internet: URL:http://www.3gpp.org/ftp/Specs/zltuInfo/M.2012-2/2014-12/Rel-12/25_series/ [retrieved on Mar. 17, 2014], pp. 1-71.

(Continued)

*Primary Examiner* — Brandon M Renner
(74) *Attorney, Agent, or Firm* — Arent Fox, LLP Qualcomm Incorporated

(57) ABSTRACT

Aspects described herein relate to communicating using multicast in a wireless network. A connection with an access point can be established using a cellular radio access technology. An internet protocol request for multicast communications can be transmitted to the access point over the connection. Multicast data can be received from the access point over resources corresponding to over-the-air multicast communications based on the internet protocol request.

116 Claims, 14 Drawing Sheets

(51) Int. Cl.
*H04W 72/04* (2009.01)
*H04W 48/20* (2009.01)
*H04W 12/04* (2009.01)
*H04W 76/40* (2018.01)
*H04L 12/18* (2006.01)
*H04W 4/06* (2009.01)
*H04W 4/08* (2009.01)
*H04W 80/04* (2009.01)

(52) U.S. Cl.
CPC ............ *H04W 12/04* (2013.01); *H04W 48/20* (2013.01); *H04W 72/0446* (2013.01); *H04W 76/40* (2018.02); *H04W 4/08* (2013.01); *H04W 80/04* (2013.01)

(56) References Cited

U.S. PATENT DOCUMENTS

| | | | | |
|---|---|---|---|---|
| 2004/0165589 | A1* | 8/2004 | Tomich | H04L 12/2803 370/389 |
| 2006/0072532 | A1* | 4/2006 | Dorenbosch | H04L 12/185 370/342 |
| 2006/0098613 | A1* | 5/2006 | Kish | H04N 21/6405 370/338 |
| 2006/0218273 | A1* | 9/2006 | Melvin | H04L 63/102 709/224 |
| 2007/0230441 | A1* | 10/2007 | Sethi | H04L 12/18 370/352 |
| 2009/0080354 | A1* | 3/2009 | Shin | H04W 4/06 370/312 |
| 2010/0232437 | A1* | 9/2010 | Bajpai | H04L 1/1628 370/400 |
| 2011/0158208 | A1* | 6/2011 | Solanki | H04L 12/185 370/338 |
| 2012/0230232 | A1* | 9/2012 | Ji | H04B 7/2656 370/280 |
| 2014/0286221 | A1* | 9/2014 | Chandramouli | H04W 76/40 370/312 |
| 2015/0003284 | A1* | 1/2015 | Gupta | H04W 4/08 370/254 |
| 2016/0050558 | A1* | 2/2016 | Wallentin | H04W 8/005 370/329 |
| 2016/0226634 | A1* | 8/2016 | Axmon | H04L 5/001 |
| 2016/0261394 | A1* | 9/2016 | Kazmi | H04L 5/0044 |
| 2017/0094688 | A1* | 3/2017 | Lee | H04W 74/0833 |

OTHER PUBLICATIONS

International Search Report and Written Opinion—PCT/US2017/012538—ISA/EPO —dated Apr. 12, 2017. 18 pages.

* cited by examiner

TECHNIQUES FOR MULTICAST WIRELESS COMMUNICATIONS

CLAIM OF PRIORITY UNDER 35 U.S.C. § 119

The present Application for Patent claims priority to Provisional Application No. 62/276,664 entitled "TECHNIQUES FOR MULTICAST WIRELESS COMMUNICATIONS" filed Jan. 8, 2016, which is assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

Additionally, LTE radio access functionality has been extended into unlicensed frequency spectrums, such as the Unlicensed National Information Infrastructure (U-NII) band used by Wireless Local Area Network (WLAN) technologies. This extension of cell LTE operation is designed to increase spectral efficiency and hence capacity of the LTE system, and is often provided by small cells. Examples of technologies that provide LTE functionality over WLAN technologies include LTE in an unlicensed spectrum (LTE-U), which can utilize a 20 megahertz (MHz) channel bandwidth, 15 kilohertz (KHz) subcarrier spacing, and a 30.72 MHz sampling rate, and enhanced component carrier (eCC), which can utilize a 20, 40, or 80 MHz channel bandwidth, a 75 KHz subcarrier spacing, and a sampling rate proportional to 38.4 MHz (e.g., depending on the channel bandwidth). As these technologies utilize the unlicensed spectrum, wireless communications, including multicast communications, may be transmitted according to a communication schedule (e.g., a discontinuous receive (DRX) cycle) so as to minimize interfere with other devices using the spectrum. This may present challenges in multicast communications to devices that may not receive communications at the same time. In addition, in LTE or other cellular technologies, a DRX mode may be utilized by devices to conserve radio resources where the devices in DRX mode may periodically turn receiver resources on and off, which may similarly present challenges in multicast communications to devices having differing DRX cycle parameters.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating using multicast in a wireless network is provided. The method includes establishing a connection with an access point using a cellular radio access technology, transmitting, to the access point over the connection, an internet protocol request for multicast communications, and receiving, from the access point and based on the internet protocol request, multicast data over resources corresponding to over-the-air multicast communications.

In another example, an apparatus for communicating using multicast in a wireless network is provided. The apparatus includes a transceiver for communicating one or more wireless signals via one or more antennas, a memory configured to store instructions, and at least one processor communicatively coupled with the transceiver and the memory. The at least one processor is configured to establish a connection with an access point using a cellular radio access technology, transmit, to the access point over the connection, an internet protocol request for multicast communications, and receive, from the access point and based on the internet protocol request, multicast data over resources corresponding to over-the-air multicast communications.

In another example, an apparatus for communicating using multicast in a wireless network is provided. The apparatus includes means for establishing a connection with an access point using a cellular radio access technology, means for transmitting, to the access point over the connection, an internet protocol request for multicast communications, and means for receiving, from the access point and based on the internet protocol request, multicast data over resources corresponding to over-the-air multicast communications.

In another example, a computer-readable storage medium including computer-executable code for communicating using multicast in a wireless network is provided. The code includes code for establishing a connection with an access point using a cellular radio access technology, code for transmitting, to the access point over the connection, an internet protocol request for multicast communications, and code for receiving, from the access point and based on the internet protocol request, multicast data over resources corresponding to over-the-air multicast communications.

In other aspects, a method for communicating using multicast in a wireless network is provided. The method includes establishing a connection with a user equipment (UE) using a cellular radio access technology, receiving, from the UE over the connection, an internet protocol request from multicast communications, and transmitting, to the UE and one or more other UEs and based on the internet protocol request, multicast data over resources corresponding to over-the-air multicast communications.

In another example, an apparatus for communicating using multicast in a wireless network is provided. The apparatus includes a transceiver for communicating one or more wireless signals via one or more antennas, a memory configured to store instructions, and at least one processor communicatively coupled with the transceiver and the memory. The at least one processor is configured to establish a connection with a UE using a cellular radio access technology, receive, from the UE over the connection, an internet protocol request from multicast communications, and transmit, to the UE and one or more other UEs and based on the internet protocol request, multicast data over resources corresponding to over-the-air multicast communications.

In another example, an apparatus for communicating using multicast in a wireless network is provided. The apparatus includes means for establishing a connection with a UE using a cellular radio access technology, means for receiving, from the UE over the connection, an internet protocol request from multicast communications, and means for transmitting, to the UE and one or more other UEs and based on the internet protocol request, multicast data over resources corresponding to over-the-air multicast communications.

In another example, a computer-readable storage medium including computer-executable code for communicating using multicast in a wireless network is provided. The code includes code for establishing a connection with a UE using a cellular radio access technology, code for receiving, from the UE over the connection, an internet protocol request from multicast communications, and code for transmitting, to the UE and one or more other UEs and based on the internet protocol request, multicast data over resources corresponding to over-the-air multicast communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
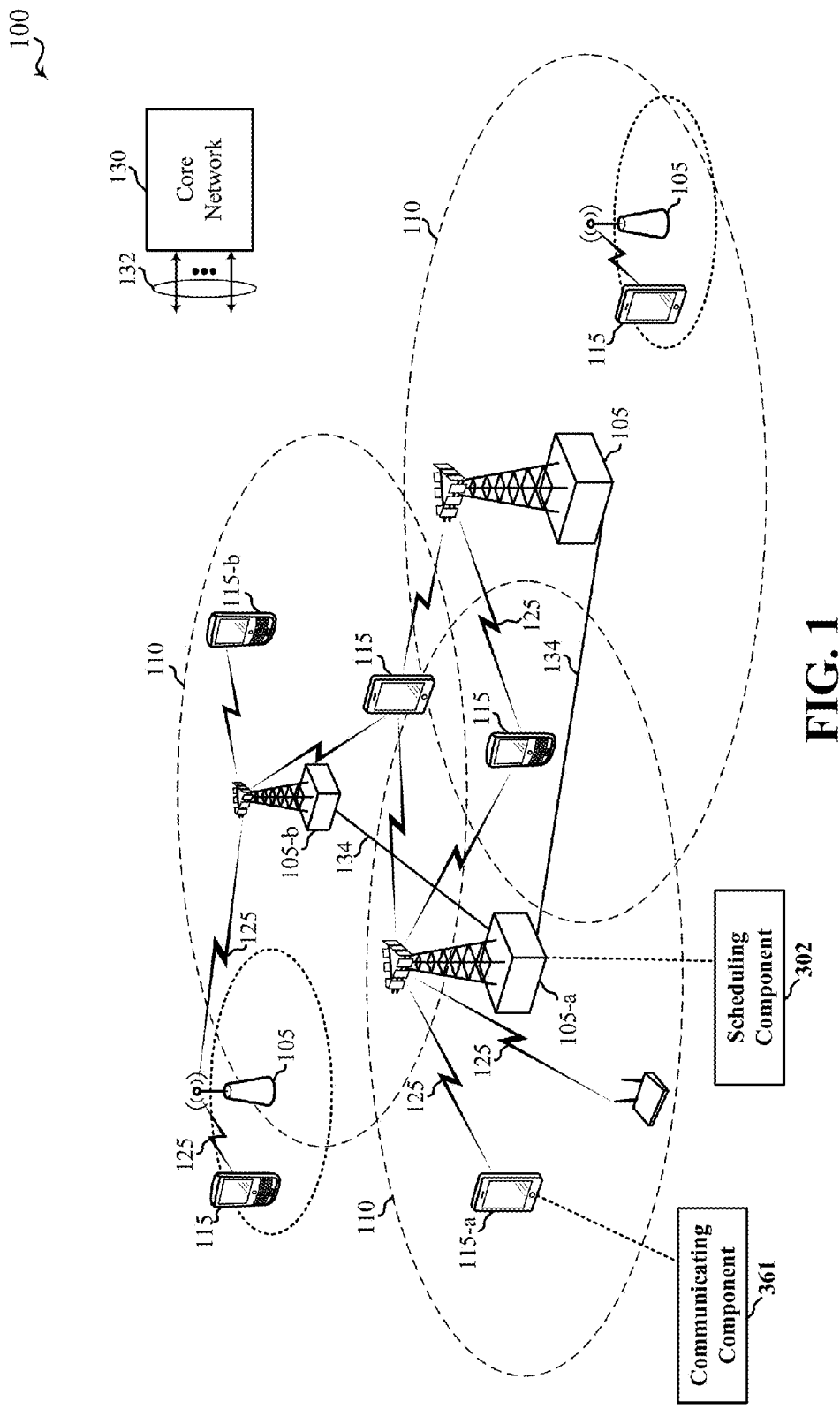
FIG. 1 shows a block diagram conceptually illustrating an example of a telecommunications system, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to providing multicast signaling and/or media data in technologies where devices may not be configured to receive communications during the same periods of time. For example, some cellular radio access technologies (RAT) can utilize discontinuous receive (DRX) mode where devices power on radio resources in a period of time (referred to herein as a DRX ON, or ON, duration) and power off receiver resources during another period of time (referred to herein as a DRX OFF, or OFF, durations) to conserve power. In an example, devices can be configured with a DRX cycle that can define the ON/OFF durations. The devices, however, may be configured with different DRX cycles (e.g., cycles having different ON/OFF durations, different cycle lengths, etc.). In another example, devices that utilize an unlicensed spectrum, such as third generation partnership project (3GPP) long term evolution (LTE) in an unlicensed spectrum (e.g., LTE-U, licensed assisted access (LAA), etc.), enhanced component carrier (eCC), etc., may also use a DRX cycle in receiving communications so the access point may not constantly utilize the medium, which may otherwise cause other devices using the unlicensed frequency band to be shut out or unable to communicate using the unlicensed spectrum. Accordingly, aspects related to providing multicast communications in DRX mode and/or in RATs that utilize an unlicensed frequency band are described herein. LTE-U, LAA, eCC may be referred to specifically herein, but concepts described herein may be applied to LTE, LTE-U, LAA, eCC, and/or similar technologies.

For example, a device can transmit an internet protocol (IP) request, such as an internet group management protocol (IGMP) request, to receive multicast data from one or more access points. An access point can communicate multicast data to the device and/or other devices based at least in part on the IP request, where the multicast data is communicated over resources corresponding to over-the-air (OTA) multicast communications. In one example, the access point can delay packet broadcast based on a DRX cycle of one or more devices receiving multicast broadcast. In another example, the access point can assign a group identifier to one or more devices to receive multicast data, which can be used to determine resources for communicating multicast data. In an example, the access point may assign or otherwise indicate the group identifier for locating multicast data resources in a configured DRX ON duration and/or in an ON duration specific to one or more devices. In any case, the device may receive the multicast data during a DRX ON duration, whether the DRX ON duration is that of the device, a DRX ON duration indicated by the access point (e.g., in a configured DRX ON duration, the DRX ON duration of the device, etc.).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. For instance, the various systems can include additional devices, components, modules, etc. and/or may not include all of the devices, components, modules etc. discussed in connection with the figures. A combination of these approaches can also be used.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. One or more of access points 105 can include a scheduling component 302 for scheduling multicast communications for one or more UEs 115. One or more of UEs 115 can include a communicating component 361 for receiving multicast communications from the one or more access points 105.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of communication links 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. For example, there can be a PCell for each of communication links 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells. The term eNB, as used generally herein, may relate to a macro eNB and/or a small cell eNB.

In an example, a small cell may operate in an "unlicensed" frequency band or spectrum, which can refer to a portion of radio frequency (RF) space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum. In addition, for illustration purposes, the description below may refer in some respects to an LTE system operating on an unlicensed band by way of example when appropriate, although such descriptions may not be intended to exclude other cellular communication technologies. LTE on an unlicensed band may also be referred to herein as LTE/LTE-Advanced in unlicensed spectrum, or simply LTE, in the surrounding context.

The core network 130 may communicate with the eNBs or other access points 105 via a backhaul links 132 (e.g., Si interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of one or more hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer.

In another example, a UE 115 may communicate with an access point 105 using an LTE-U RAT at a 20 MHz channel bandwidth, a 15 KHz subcarrier spacing, and a 30.72 MHz sampling rate. In another specific example, a UE 115 may additionally or alternatively communicate with an access point 105 using an eCC RAT at a 20, 40, or 80 MHz channel bandwidth, a 75 KHz subcarrier spacing, and a 38.4 MHz sampling rate.

In any case, UE 115 may utilize DRX in communicating with access point 105 according to a DRX cycle that may be defined by the access point 105, negotiated between the UE 115 and access point 105, etc. In this example, scheduling component 302 can schedule multicast communications for the UE 115 based at least in part on the DRX cycle of the UE 115 (e.g., which may have been initially configured for unicast communications) or another DRX cycle (e.g., configured for multicast communications), as described further herein. UE 115 can receive the multicast communications and/or determine resources over which to receive the multicast communications based on communications from the access point 105, as described further herein. Additional details regarding features and functions related to communications in systems described above, are provided below with reference to the following figures.

Figure 2:
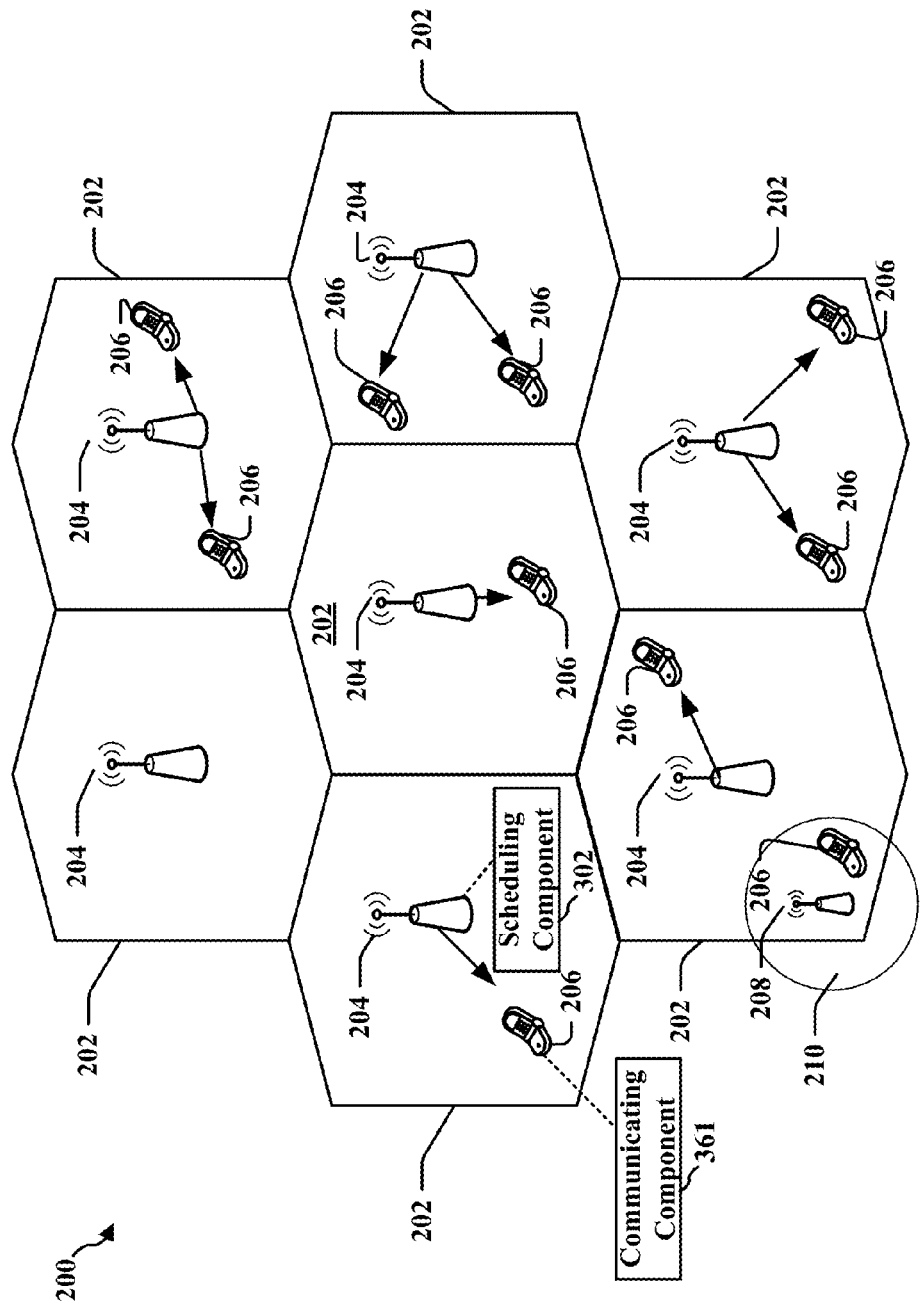
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 may have cellular regions 210 that overlap with one or more of the cells 202. The small cell eNBs 208 may be of a lower power class (e.g., home eNB (HeNB)), femto cell pico cell, micro cell, or remote radio head (RRH). The macro eNBs 204 are each assigned to a respective cell 202 and are configured to provide an access point to the core network 130 for all the UEs 206 in the cells 202. In an aspect, one or more of eNBs 204, small cell eNBs 208, etc. can include a scheduling component 302 for scheduling multicast communications for one or more UEs 206. One or more of UEs 206 can include a communicating component 361 for receiving multicast communications from the one or more eNBs 204, small cell eNBs 208, etc. There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications (e.g., including LTE-U, eCC, etc.), OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
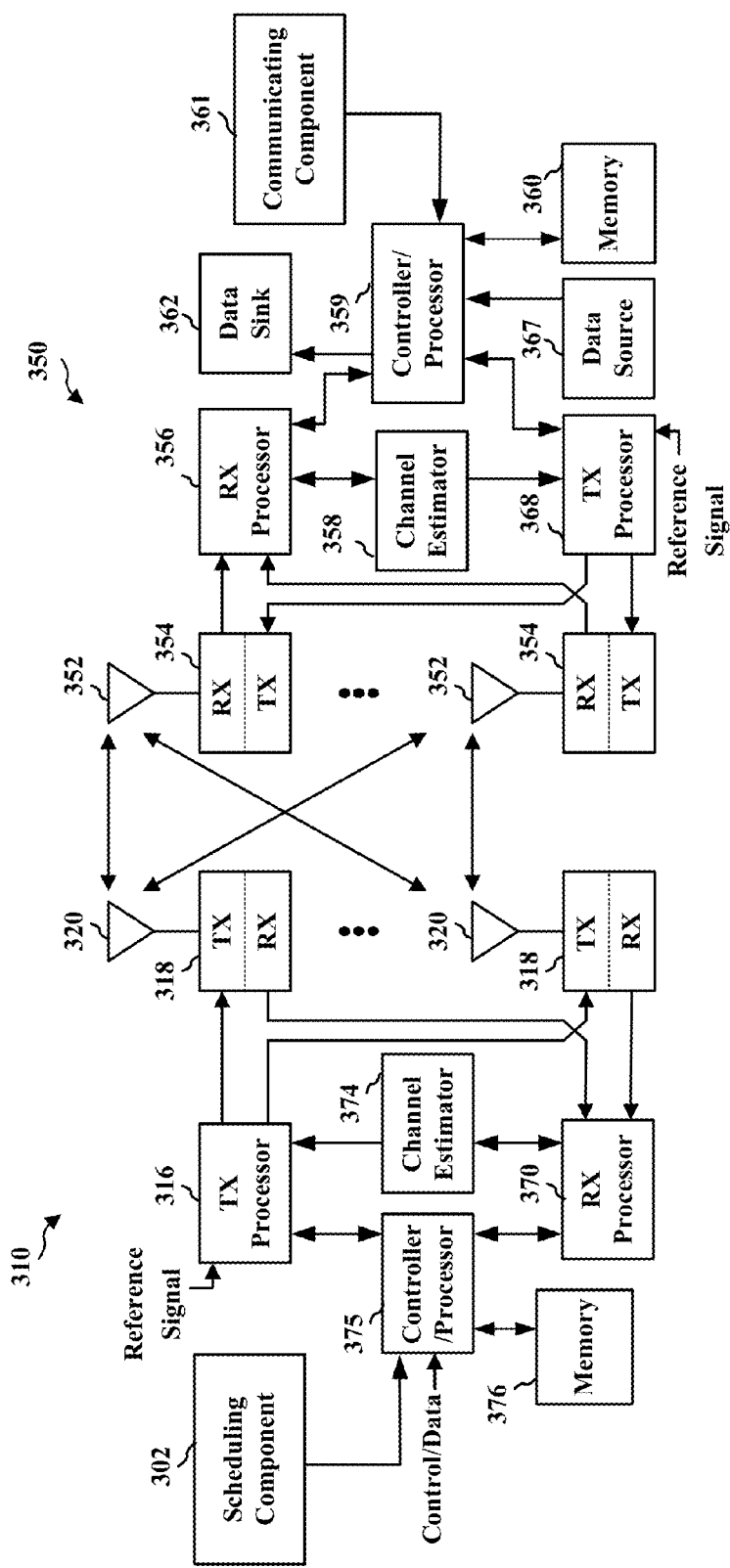
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARD) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. eNB 310 can include a scheduling component 302 for scheduling multicast communications for one or more UEs 350. Though scheduling component 302 is shown as coupled to controller/processor 375, scheduling component 302 can also be coupled to other processors (e.g., TX processor 316, RX processor 370, etc.) and/or implemented by the one or more processors 316, 375, 370 to perform actions described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 for receiving multicast communications from the one or more eNBs 310. Though communicating component 361 is shown as coupled to controller/processor 359, communicating component 361 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4A:
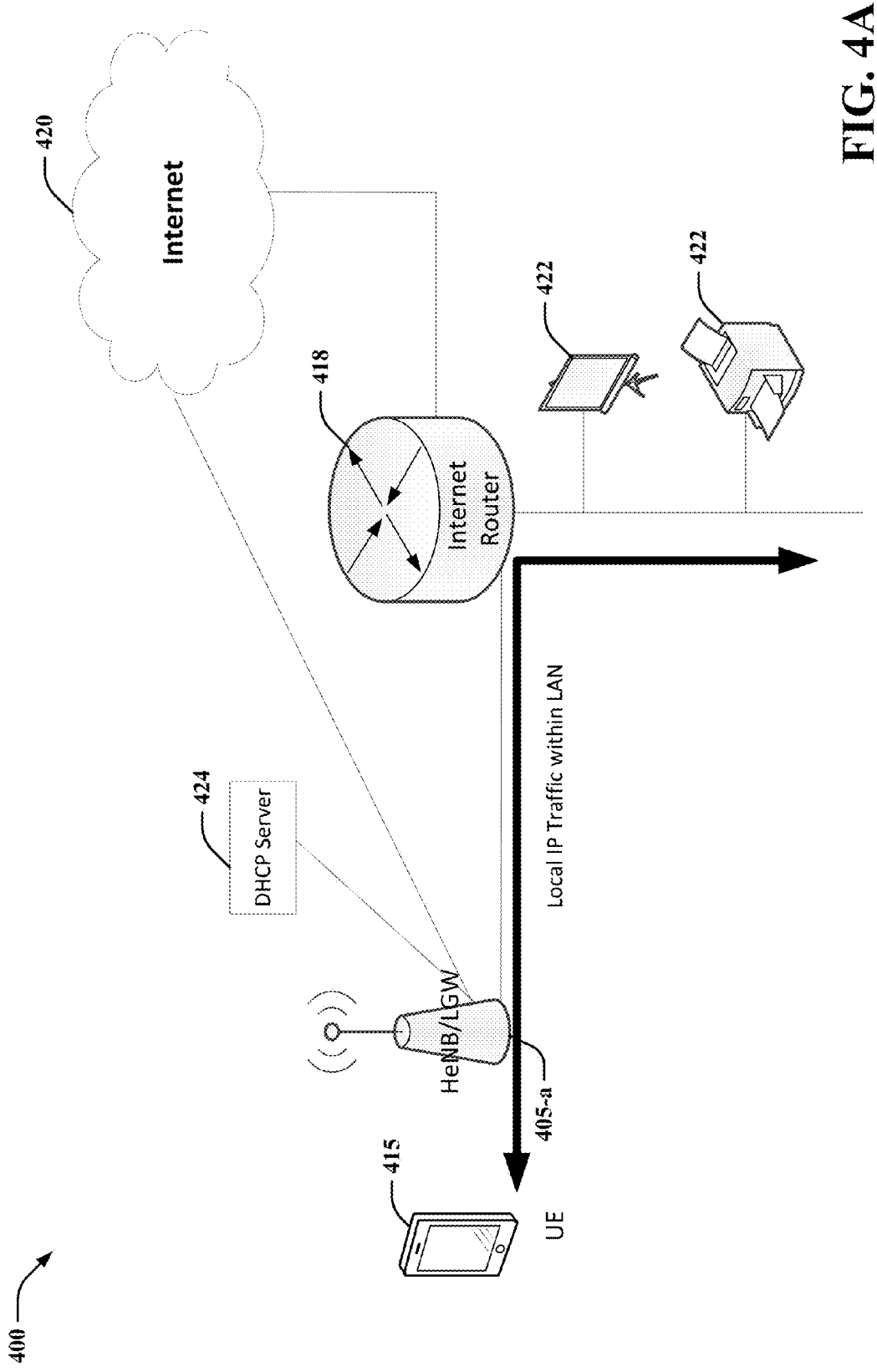
FIG. 4A illustrates an example of a residential system architecture for providing long term evolution (LTE) in an unlicensed frequency (LTE-U) in accordance with aspects described herein.
Figure 4B:
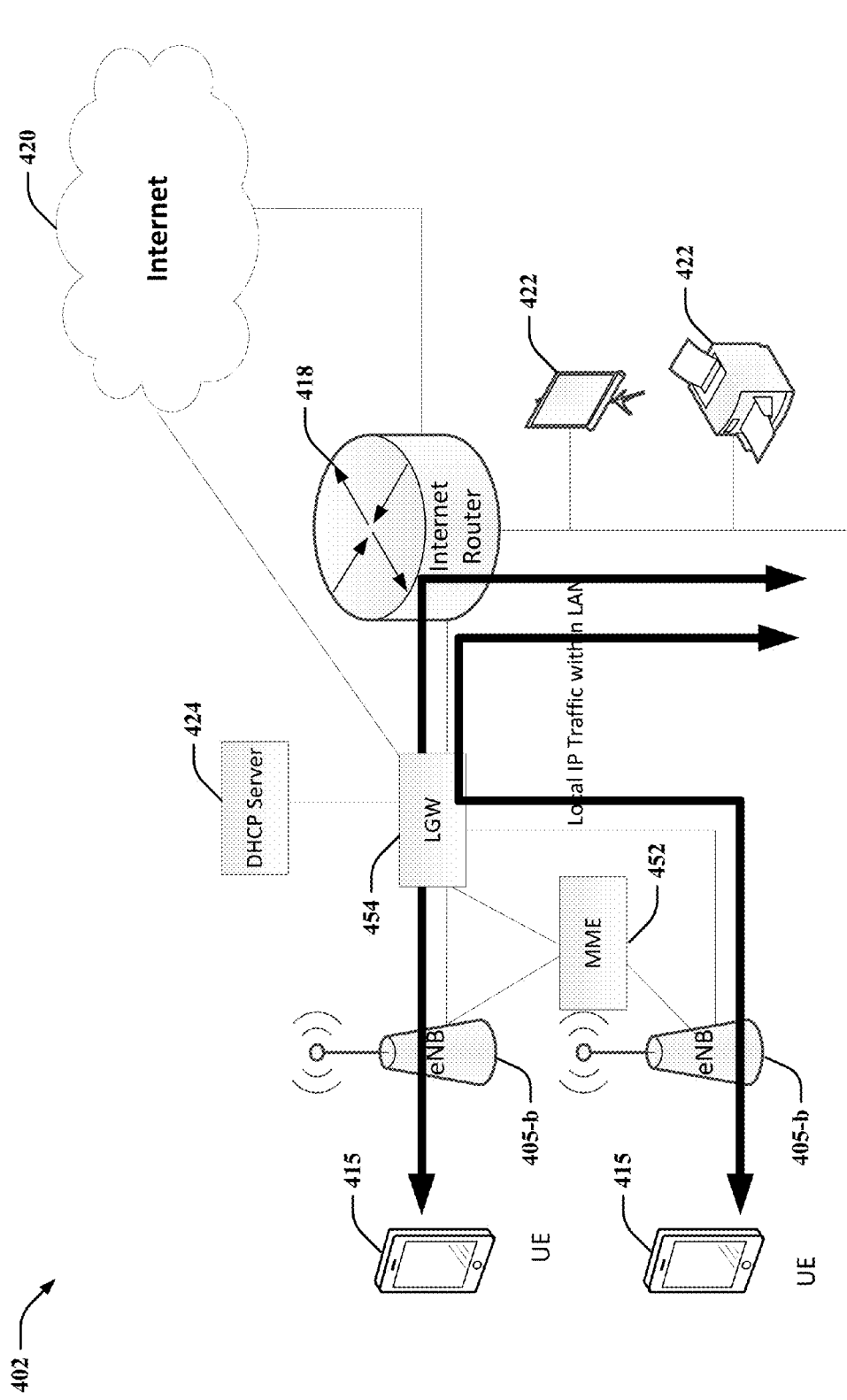
FIG. 4B illustrates an example of an enterprise system architecture for providing long term evolution (LTE) in an unlicensed frequency (LTE-U) in accordance with aspects described herein.

FIGS. 4A-4B illustrate examples of systems 400, 402 having architectures that can support an LTE-U RAT in accordance with aspects described herein. System 400 in FIG. 4A can represent a residential or other smaller scale deployment where access point 405-*a* may be coupled to an internet router 418 to provide one or more UEs 415 with access to internet 420, access to one or more devices 422 on a local network (e.g., via local internet protocol (IP) access (LIPA)), etc. Access point 405-*a* may include a HeNB and/or local gateway (LGW) where the HeNB portion can provide a radio access network (RAN) interface to communicate with the UE 415 over-the-air (OTA), and the LGW portion can provide backend access to the local network and/or internet 420 via internet router 418. In addition, for example, access point 405-*a* may communicate with a dynamic host configuration protocol (DHCP) server 424 (e.g., via internet router 418) to configure UEs 415 on the local network (e.g., with an IP address, domain name system (DNS) configuration, gateway IP address, etc.). In any case, access point 405-*a* can multicast communications to one or more UEs 415 in accordance with aspects described herein, which may be based on a DRX configuration or otherwise.

System 402 in FIG. 4B can represent an enterprise or other larger scale deployment where access point 405-*b* may be an eNB (e.g., one of multiple eNBs) coupled to the internet router 418 via a mobility management entity (MME) 452 and/or a separate LGW 454. For example, MME 452 can provide activation/deactivation of bearers between the access point 405-*b* and other network components to allow UEs 415 to access the network. Similarly, in this system 402, internet router 418 may provide one or more UEs 415 with access to internet 420, access to one or more devices 422 on a local network (e.g., using LIPA), etc., via LGW 454. In addition, for example, access point 405-*b* may communicate with a DHCP server 424 (e.g., via internet router 418) to configure UEs 415 on the local network (e.g., with an IP address, DNS configuration, gateway IP address, etc.). In any case, access point 405-*b* can multicast communications to one or more UEs 415 in accordance with aspects described herein, which may be based on a DRX configuration or otherwise.

Figure 5:
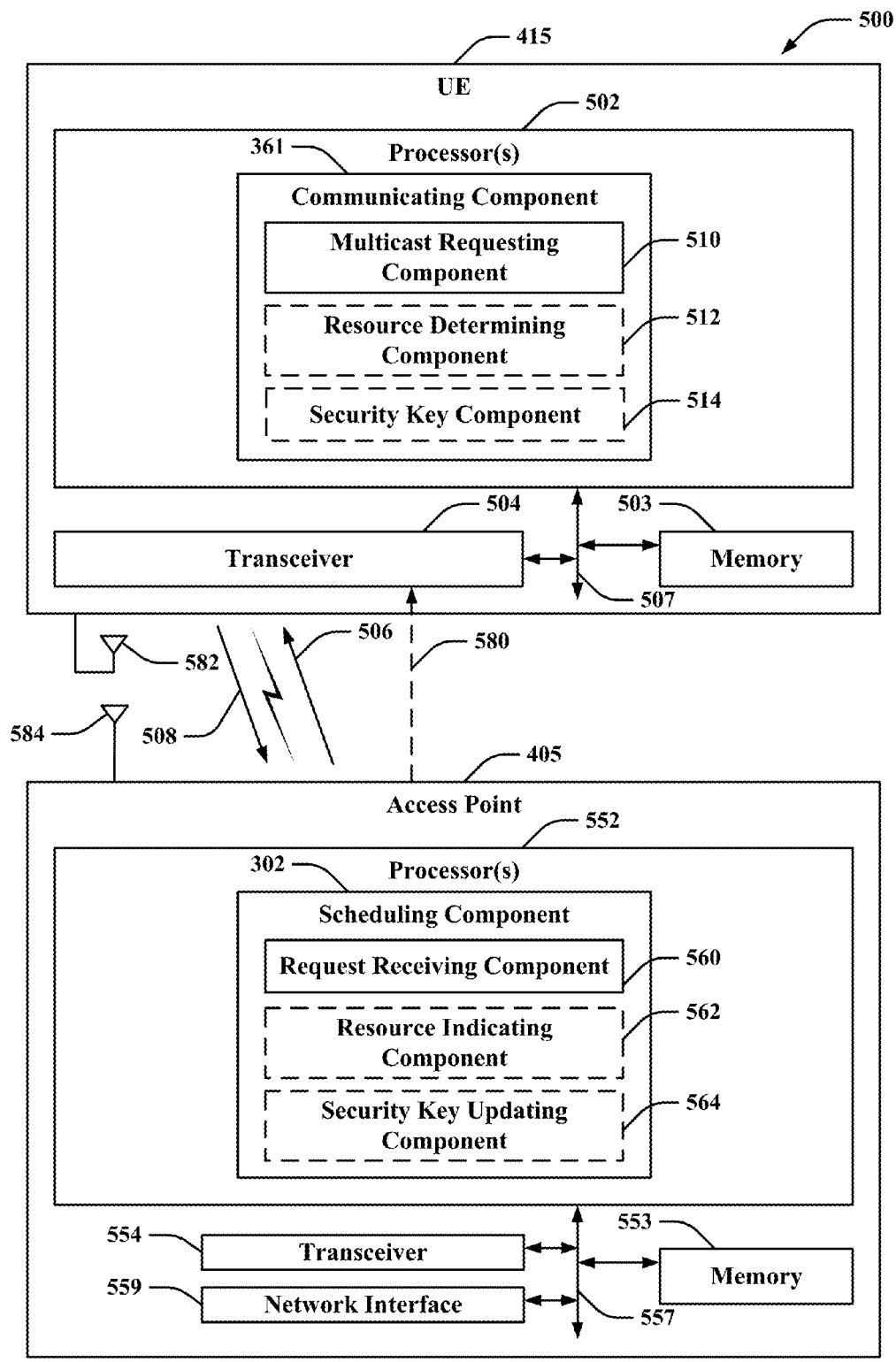
FIG. 5 illustrates an example of a system for communicating using multicast in accordance with aspects described herein.
Figure 6:
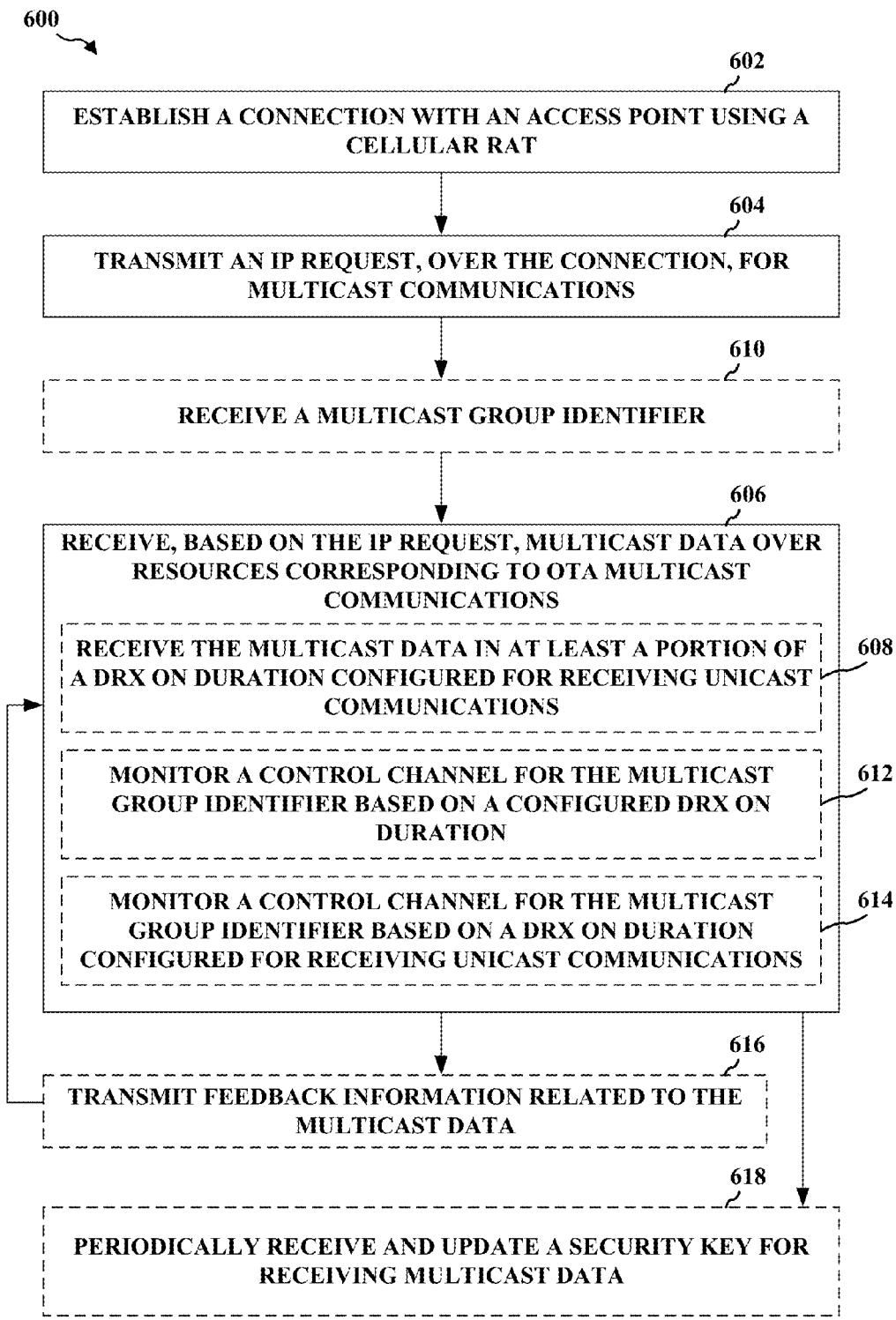
FIG. 6 illustrates an example of a method for receiving multicast communications in accordance with aspects described herein.
Figure 7:
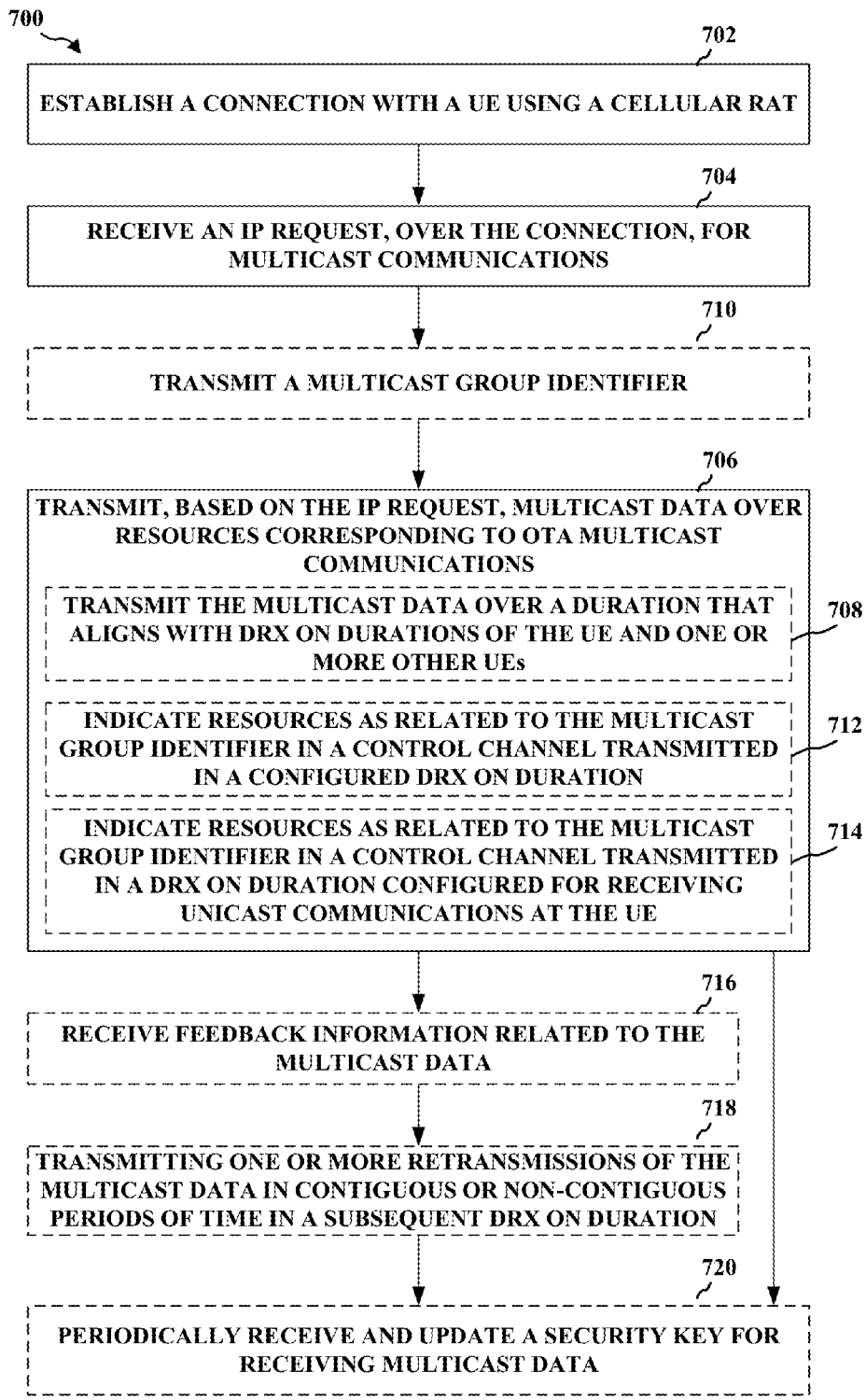
FIG. 7 illustrates an example of a method for transmitting multicast communications in accordance with aspects described herein.

Turning now to FIGS. 5-7, aspects are depicted with reference to one or more components and one or more methods that may perform the actions or operations described herein, where aspects in dashed line may be optional. Although the operations described below in FIGS. 6-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 5 depicts a system 500 for communicating multicast data in accordance with aspects described herein. System 500 includes a UE 415 that communicates with an access point 405 to access a wireless network, examples of which are described in FIGS. 1-4B above (e.g., UEs 115, 206, 350, 415, access points/eNBs 105, 204, 208, 310, 405, etc.). In an aspect, access point 405 and UE 415 may have established one or more downlink channels over which downlink signals 506 can be transmitted by access point 405 (e.g., via transceiver 554) and received by UE 415 (e.g., via transceiver 504) for communicating control and/or data messages (e.g., signaling) from the access point 405 to the UE 415 over configured communication resources. Moreover, for example, access point 405 and UE 415 may have established one or more uplink channels over which uplink signals 508 can be transmitted by UE 415 (e.g., via transceiver 504) and received by access point 405 (e.g., via transceiver 554) for communicating control and/or data messages (e.g., signaling) from the UE 415 to the access point 405 over configured communication resources. For example, access point 405 may transmit a signal 580 to UE 415, which is transmitted via transceiver 554 and received via transceiver 504. Signal 580 may include control data, such as scheduling information (which may include a DRX configuration for UE 415 and/or for multicast communications), traffic data (e.g., unicast data, multicast data, etc.), and/or the like.

In an aspect, UE 415 may include one or more processors 502 and/or a memory 503 that may be communicatively coupled, e.g., via one or more buses 507, and may operate in conjunction with or otherwise implement a communicating component 361 for receiving multicast communications from the one or more access points 405. For example, the various operations related to the communicating component 361 may be implemented or otherwise executed by one or more processors 502 and, in an aspect, can be executed by a single processor, while in other aspects, different ones of the operations may be executed by a combination of two or more different processors. For example, in an aspect, the one or more processors 502 may include any one or any combination of a modem processor, or a baseband processor, or a digital signal processor, or an application specific integrated circuit (ASIC), or a transmit processor, or a transceiver processor associated with transceiver 504. Further, for example, the memory 503 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 502. Moreover, memory 503 or computer-readable storage medium may be resident in the one or more processors 502, external to the one or more processors 502, distributed across multiple entities including the one or more processors 502, etc.

In particular, the one or more processors 502 and/or memory 503 may execute actions or operations defined by communicating component 361 or its subcomponents. For instance, the one or more processors 502 and/or memory 503 may execute actions or operations defined by a multicast requesting component 510 for requesting multicast communications from an access point 405. In an aspect, for example, multicast requesting component 510 may include hardware (e.g., one or more processor modules of the one or more processors 502) and/or computer-readable code or instructions stored in memory 503 and executable by at least one of the one or more processors 502 to perform the specially configured multicast requesting operations described herein. Further, for instance, the one or more processors 502 and/or memory 503 may execute actions or operations defined by an optional resource determining component 512 for determining resources for receiving multicast communications from the access point 405. In an aspect, for example, resource determining component 512 may include hardware (e.g., one or more processor modules of the one or more processors 502) and/or computer-readable code or instructions stored in memory 503 and executable by at least one of the one or more processors 502 to perform the specially configured resource determining operations described herein. Further, for instance, the one or more processors 502 and/or memory 503 may optionally execute actions or operations defined by an optional security key component 514 for managing a security key for decoding multicast communications from the access point 405. In an aspect, for example, security key component 514 may include hardware (e.g., one or more processor modules of the one or more processors 502) and/or computer-readable code or instructions stored in memory 503 and executable by at least one of the one or more processors 502 to perform the specially configured security key operations described herein.

Similarly, in an aspect, access point 405 may include one or more processors 552 and/or a memory 553 that may be communicatively coupled, e.g., via one or more buses 557, and may operate in conjunction with or otherwise implement a scheduling component 302 for scheduling multicast communications for one or more UEs 415. For example, the various functions related to scheduling component 302 may be implemented or otherwise executed by one or more processors 552 and, in an aspect, can be executed by a single processor, while in other aspects, different ones of the functions may be executed by a combination of two or more different processors, as described above. In one example, the one or more processors 552 and/or memory 553 may be configured as described in examples above with respect to the one or more processors 502 and/or memory 503 of UE 415.

In an example, the one or more processors 552 and/or memory 553 may execute actions or operations defined by scheduling component 302 or its subcomponents. For instance, the one or more processors 552 and/or memory 553 may execute actions or operations defined by a request receiving component 560 for receiving a request for multicast communications from one or more UEs 415. In an aspect, for example, request receiving component 560 may include hardware (e.g., one or more processor modules of the one or more processors 552) and/or computer-readable code or instructions stored in memory 553 and executable by at least one of the one or more processors 552 to perform the specially configured request receiving operations described herein. Further, for instance, the one or more processors 552 and/or memory 553 may execute actions or operations defined by an optional resource indicating component 562 for indicating one or more parameters related to resources over which multicast communications are transmitted. In an aspect, for example, resource indicating component 562 may include hardware (e.g., one or more processor modules of the one or more processors 552) and/or computer-readable code or instructions stored in memory 553 and executable by at least one of the one or more processors 552 to perform the specially configured resource indicating operations described herein. Further, for instance, the one or more processors 552 and/or memory 553 may execute actions or operations defined by an optional security key updating component 564 for periodically updating a security key for decoding multicast communications from access point 405. In an aspect, for example, security key updating component 564 may include hardware (e.g., one or more processor modules of the one or more processors 552) and/or computer-readable code or instructions stored in memory 553 and executable by at least one of the one or more processors 552 to perform the specially configured security key operations described herein.

In an example, transceivers 504, 554 may be configured to transmit and receive wireless signals through one or more antennas 582, 584 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 504, 554 may be tuned to operate at specified frequencies such that UE 415 and/or access point 405 can communicate at a certain frequency. In an aspect, the one or more processors 502, 552 may configure transceivers 504, 554 to operate at a specified frequency and power level based on a configuration, a communication protocol, etc.

In an aspect, transceivers 504, 554 can operate in multiple bands (e.g., using a multiband-multimode modem, not shown) such to process digital data sent and received using transceivers 504, 554. In an aspect, transceivers 504, 554 can be multiband and be configured to support multiple frequency bands for a specific communications protocol. In an aspect, transceivers 504, 554 can be configured to support multiple operating networks and communications protocols. Thus, for example, transceivers 504, 554 may enable transmission and/or reception of signals based on a specified modem configuration.

Moreover, for example, access point 405 may include a network interface 559 for communicating with one or more network components (not shown), such as MME 452, LGW 454, or other evolved packet core (EPC) network components. For example, network interface 559 can include a wired or wireless interface over which the access point 405 can communicate with network components using a backhaul link (e.g., an X2 interface).

Referring to FIG. 6, an example of a method 600 is illustrated for requesting and/or receiving (e.g., by a UE) multicast data from an access point. Referring to FIG. 7, an example of a method 700 is illustrated for transmitting (e.g., by an access point) multicast data to one or more UEs. In methods 600, 700, blocks indicated as dashed boxes represent optional steps.

Method 600 includes, at Block 602, establishing a connection with an access point using a cellular RAT. In an aspect, communicating component 361, e.g. in conjunction with processor(s) 502, memory 503, and/or transceiver 504, can establish a connection with the access point (e.g., access point 405) using the cellular RAT. For example, communicating component 361 can establish the connection with the access point 405 by using an access procedure over an access channel provided by the access point 405 (e.g., a random access channel (RACH)) to request connection establishment. For example, the cellular RAT may include LTE, LTE-U, etc., as described herein.

Method 700 includes, at Block 702, establishing a connection with a UE using a cellular RAT. In an aspect, scheduling component 302, e.g. in conjunction with processor(s) 552, memory 553, and/or transceiver 554, can establish a connection with the UE (e.g., UE 415) using the cellular RAT. For example, scheduling component 302 can provide the access channel (e.g., RACH), and/or broadcast information regarding the RACH over one or more broadcast channels. In either case, UE 415 can request to establish a connection with access point 405 over the RACH (e.g., by transmitting a RACH preamble over the determined RACH).

Method 600 may also include, at Block 604, transmitting an IP request, over the connection, for multicast communications. In an aspect, multicast requesting component 510, e.g., in conjunction with processor(s) 502, memory 503, and/or transceiver 504, can transmit the IP request, over the connection (e.g., to access point 405), for multicast communications. In one example, the request may include an IGMP request transmitted to request multicast group membership in an IP network. In this regard, for example, the request can be transmitted by the UE 415 to access point 405 using the cellular RAT, and the access point 405 may forward the IGMP request to one or more network components, such as an LGW that may be part of the access point 405 (e.g., as in system 400), a separate LGW (e.g., LGW 454 in system 402), and/or the like. An MME (e.g., MME 452), internet router (e.g., internet router 418), etc. may authorize the UE 415 to receive multicast communications and/or manage one or more aspects of the multicast communications for the UE 415, which may include managing an associated security key for decoding the communications, as described further herein. In an example, multicast requesting component 510 may transmit the request in dedicated signaling to the access point 405 (e.g., over uplink resources configured by the access point 405), as a message in the RACH procedure, and/or the like.

Method 700 can include, at Block 704, receiving an IP request, over the connection, for multicast communications. In an aspect, request receiving component 560, e.g., in conjunction with processor(s) 552, memory 553, and/or transceiver 554, can receive the IP request, over the connection (e.g., with UE 415), for multicast communications. As described, request receiving component 560 can receive the request as an IGMP request over the cellular RAT, and can forward the request to an LGW for, via one or more network components, authorizing the UE 415 and/or establishing one or more bearers for the UE 415 to receive multicast data from access point 405. Moreover, as described, request receiving component 560 can receive the request in dedicated signaling to the access point 405, as a message in the RACH procedure, and/or the like.

In any case, method 700 can also include, at Block 706, transmitting, based on the IP request, multicast data over resources corresponding to OTA multicast communications. In an aspect, scheduling component 302, e.g., in conjunction with processor(s) 552, memory 553, and/or transceiver 554, can transmit, based on the IP request, multicast data over resources corresponding to OTA multicast communications. Similarly, method 600 may also include, at Block 606, receiving, based on the IP request, multicast data over resources corresponding to OTA multicast communications.

In an aspect, communicating component 361, e.g. in conjunction with processor(s) 502, memory 503, and/or transceiver 504, can receive, based on the IP request, multicast data (e.g., from the access point 405) over resources corresponding to OTA multicast communications. For example, the resources may correspond to physical downlink shared channel (PDSCH) resources, multimedia broadcast multicast services (MBMS) resources, multicast traffic channel (MTCH), etc. in LTE, and may be used for multicast signaling and/or media data. In one example, a logical group transport channel (GTCH) over the resources may be defined for transmitting multicast data over a downlink shared channel transport channel (e.g., with or without channel quality indicator (CQI) and/or HARQ feedback).

Moreover, as described further herein, the resources may relate to or may otherwise indicate a DRX cycle (e.g., including a DRX ON duration and a DRX OFF duration) for multicast data transmission. For example, scheduling component 302 may have configured UE 415 with one or more DRX parameters for determining details of the DRX cycle, as described. Additionally, in transmitting the multicast data, scheduling component 302 may support one or more transmission modes (TM) defined in LTE, such as TM1, TM2, TM3, etc., and/or may support multicast communications in a radio resource control (RRC) connected mode and/or idle mode, as described further herein. Moreover, in an example, scheduling component 302 may configure a dedicated radio bearer (DRB) with the UE 415 specifically for transmitting the multicast communications (e.g., based on the IP request). Also, in an example, scheduling component 302 may configure packet data convergence a protocol (PDCP)/radio link control (RLC) unacknowledged mode (UM) to associate the multicast flow with a tunnel endpoint identifier (TEID) to facilitate tunneling the multicast data between the UE 415 and network components (e.g., internet router 418), as described further herein. In one example, one or more network components can communicate the TEID to the access point 405.

In one example, scheduling component 302 can transmit the multicast data communications in a DRX interval that is determined based on DRX ON durations defined for a plurality of UEs, where the plurality of UEs have requested to receive the multicast communications, are authorized (e.g. by MME 452) to receive the multicast communications, or are otherwise being scheduled to receive the multicast communications. For example, transmitting the multicast data may optionally include, at Block 708, transmitting the multicast data over a duration that aligns with DRX ON durations of the UE and one or more other UEs. In an aspect, scheduling component 302, e.g., in conjunction with processor(s) 552, memory 553, and/or transceiver 554, can transmit the multicast data over a duration that aligns with DRX ON durations of the UE and one or more other UEs. Thus, in an example, receiving the multicast data at Block 606 may optionally include, at Block 608, receiving the multicast data in at least a portion of a DRX ON duration configured for receiving unicast communications. In an aspect, communicating component 361, e.g., in conjunction with processor(s) 502, memory 503, and/or transceiver 504, can receive the multicast data in at least a portion of a DRX ON duration configured for receiving unicast communications. An example is shown in FIG. 8A.

Figure 8A:
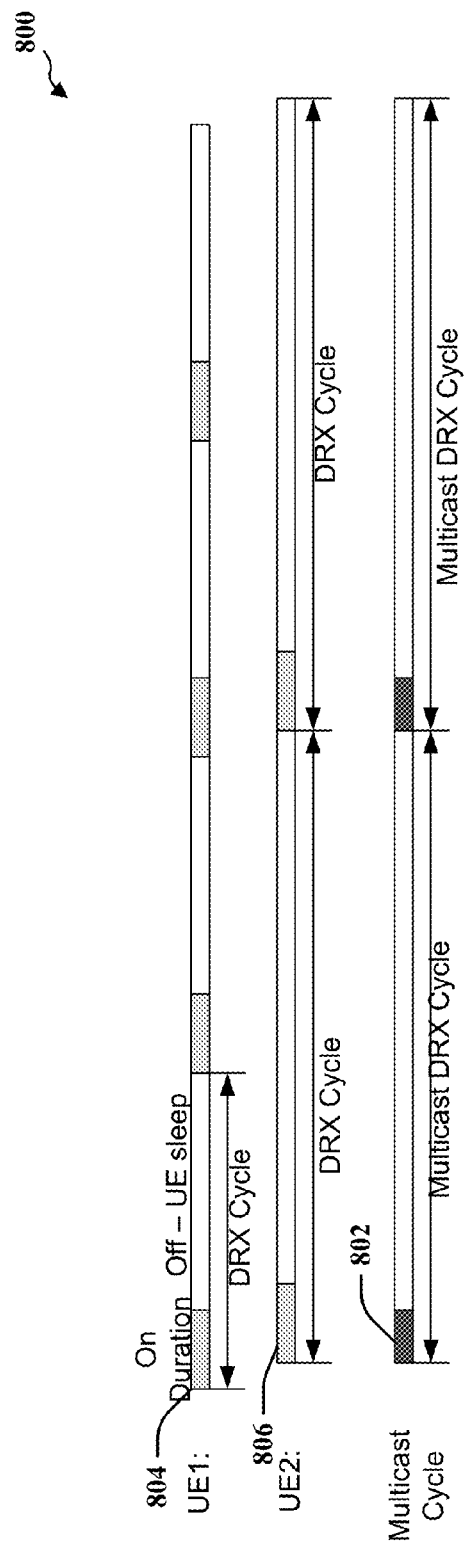
FIG. 8A illustrates an example of a resource allocation for multicast communications in accordance with aspects described herein.

FIG. 8A depicts an example of a resource allocation 800 where the access point utilizes a DRX multicast cycle for multicast communications having an ON duration 802 for resources corresponding to OTA multicast communications, where the ON duration 802 aligns with a unicast ON duration 804 configured for a UE1 and another unicast ON duration 806 configured for a UE2. Thus, scheduling component 302 can delay packet broadcast as per the DRX cycles configured for the UEs (e.g., UE1, UE2), and can broadcast packets during the DRX ON duration for the effected UEs. In other words, for example, scheduling component 302 can define a multicast DRX cycle for multicast communications to be a multiple of unicast DRX already configured for the UEs (to accommodate both unicast and multicast traffic). In any case, the UEs (e.g., UE1, UE2) can receive the multicast communications in their respective configured DRX ON durations. Thus, in an example, scheduling component 302 may determine the configured unicast DRX cycles, and may determine the multicast DRX cycle to have a similar ON duration that overlaps the ON durations of the unicast DRX cycles such that multicast transmission in the ON duration is aligned with the unicast ON durations, and/or an OFF duration that is a least common multiple of the OFF durations of the unicast DRX cycles.

In another example, method 700 may optionally include, at Block 710, transmitting a multicast group identifier. In an aspect, resource indicating component 562, e.g., in conjunction with processor(s) 552, memory 553, and/or transceiver 554, can transmit the multicast group identifier. Similarly, method 600 may optionally include, at Block 610, receiving a multicast group identifier. In an aspect, resource determining component 512, e.g., in conjunction with processor(s) 502, memory 503, and/or transceiver 504, can receive the multicast group identifier. In one example, resource indicating component 562 may transmit, and resource determining component 512 may receive, the group identifier in response to the IP request. In another example, resource indicating component 562 may broadcast, and resource determining component 512 may receive, the group identifier in system information (e.g., system information block (SIB)) and/or in a multicast control channel (MCCH). For example, access point 405 can configure the UE 415 to identify resources of the MCCH, and the UE may accordingly receive MCCH from the access point 405 to determine the group identifier for related multicast communications.

In another example, resource indicating component 562 can transmit the group identifier to each UE requesting access to receive the multicast data. In one example, resource indicating component 562 can transmit the group identifier to UEs that are determined to be authorized according to MME 452 or other network components. Moreover, in an example, access point 405 (e.g., at the direction of MME 452 or other network components or otherwise) can associate multiple multicast groups to the same group identifier, and can communicate the group identifier to UEs identified as part of the multiple multicast groups. In an example, resource indicating component 562 may associate the UE with the group identifier and may signal the association to the UE 415 through radio resource control (RRC) signaling, which can be received by resource determining component 512. In an example, the multicast group identifier can correspond to a group radio network temporary identifier (G-RNTI) that the UE 415 can use to identify resources over which the multicast data is transmitted by access point 405. In any case, as described further herein, scheduling component 302 can schedule multicast traffic using the group identifier or any other multicast RNTI that can be configured for the UEs.

For example, transmitting the multicast data at Block 706 may optionally include, at Block 712, indicating resources as related to the multicast group identifier in a control channel transmitted in a configured DRX ON duration. In an aspect, resource indicating component 562, e.g., in conjunction with processor(s) 552, memory 553, and/or transceiver 554, can indicate resources as related to the multicast group identifier in the control channel transmitted in the configured DRX ON duration (e.g., a unicast DRX ON configuration for the UE 415). In addition, receiving multicast data at Block 606 may optionally include, at Block 612, monitoring a control channel for the multicast group identifier based on a configured DRX ON duration. In an aspect, resource determining component 512, e.g., in conjunction with processor(s) 502, memory 503, and/or transceiver 504, can monitor the control channel for the multicast group identifier based on the configured DRX ON duration. For example, access point 405 can define a DRX mode for the multicast group identifier, and can indicate resource related to the DRX cycle in a control channel transmitted by the access point 405 (e.g., a physical downlink control channel (PDCCH) in LTE) in a configured DRX ON duration (e.g., a unicast DRX ON configuration for the UE 415). The DRX ON duration can be configured for the UE 415 by the access point 405 or otherwise known by the UE 415 (e.g., based on a stored configuration). In any case, resource determining component 512 can monitor the control channel during the configured DRX ON duration for the associated multicast group identifier to determine resources (e.g., a multicast DRX ON duration) over which the multicast communications are transmitted. Thus, the UE may support separate unicast and multicast DRX configurations. Examples are shown in FIG. 8B.

Figure 8B:
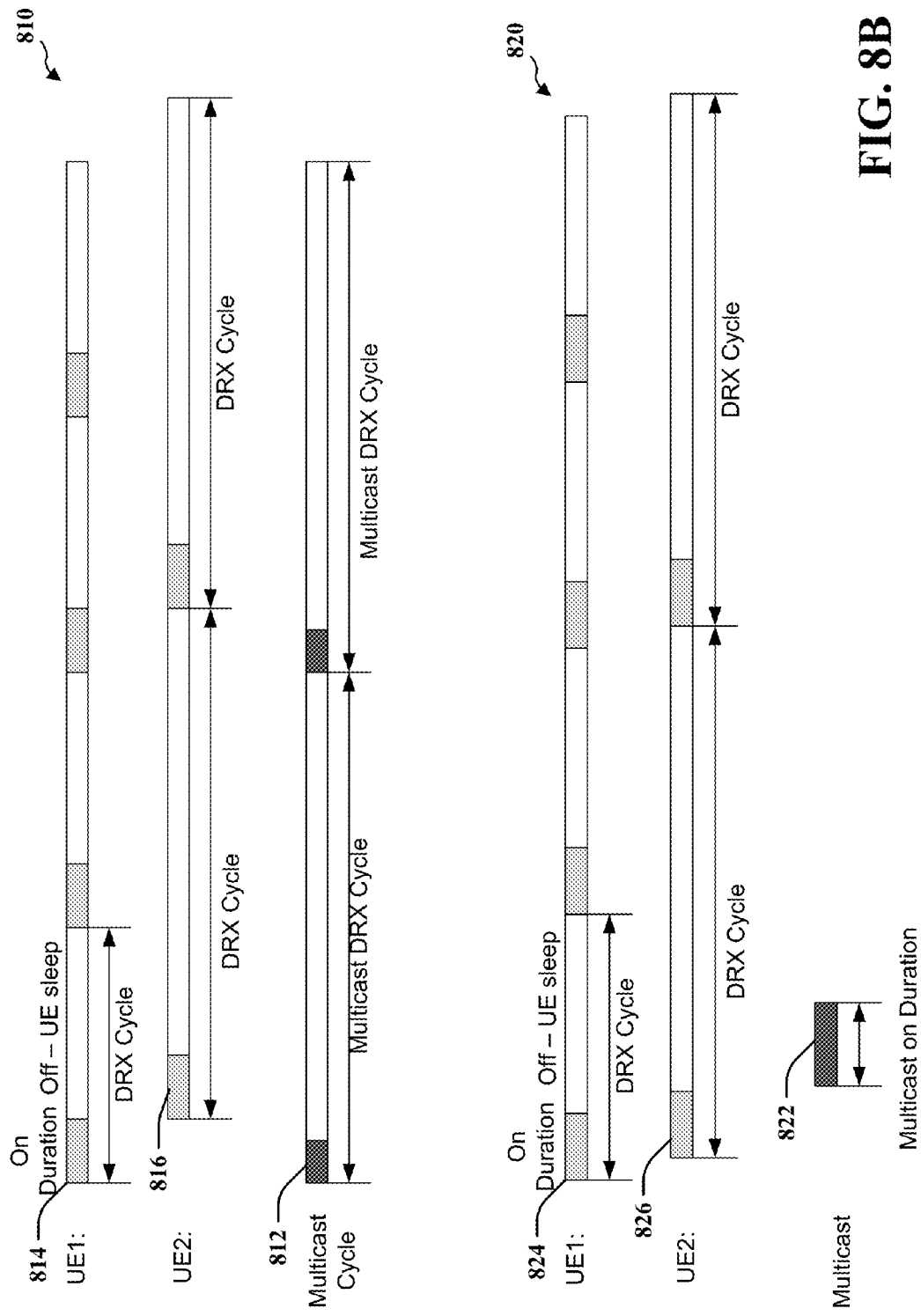
FIG. 8B illustrates an example of other resource allocations for multicast communications in accordance with aspects described herein.

FIG. 8B depicts an example of a resource allocation 810 where the access point utilizes a separate DRX multicast cycle for multicast communications. The multicast DRX cycle has an ON duration 812 for resources corresponding to OTA multicast communications, where the one or more parameters of the ON duration 812 can be configured in a control channel, as described. UE1 has a separate unicast ON duration 814, and UE2 has another separate unicast ON duration 816 that may or may not align with the multicast ON duration. In either case, however, UE1 and UE2 can both support separate unicast and multicast DRX cycles. Thus, UE1 and UE2 can determine the multicast ON duration 812 based on the control data received during the configured control channel (e.g., where the control channel may be received in the corresponding unicast ON duration), and can accordingly activate receiver resources during the multicast DRX ON duration 812 to receive multicast communications from the access point.

In another example, transmitting the multicast data at Block 706 may optionally include, at Block 714, indicating resources as related to the multicast group identifier in a control channel transmitted in a DRX ON duration configured for receiving unicast communications at the UE. In an aspect, resource indicating component 562, e.g., in conjunction with processor(s) 552, memory 553, and/or transceiver 554, can indicate resources as related to the multicast group identifier in the control channel transmitted in the DRX ON duration configured for receiving unicast communications at the UE. In addition, receiving multicast data at Block 606 may optionally include, at Block 614, monitoring a control channel for the multicast group identifier based on a DRX ON duration configured for receiving unicast communications. In an aspect, resource determining component 512, e.g., in conjunction with processor(s) 502, memory 503, and/or transceiver 504, can monitor the control channel for the multicast group identifier based on the DRX ON duration configured for receiving unicast communications. In this example, resource indicating component 562 can indicate the resources (e.g., a DRX ON duration) for multicast communications by transmitting an indication of the resources in a DRX ON duration configured for unicast at each of the UEs. Accordingly, the UE 415 can monitor for PDCCH in its configured unicast DRX ON duration, and can determine the multicast DRX ON duration for multicast communications based on identifying the multicast group identifier in a transmission over a control channel during the unicast DRX ON duration. An example is shown in FIG. 8B.

FIG. 8B depicts an example of a resource allocation 820 where the access point utilizes a separate multicast DRX ON duration 822 for resources corresponding to OTA multicast communications, where the multicast DRX ON duration 822 can be configured in a control channel, as described. UE1 has a unicast ON duration 814, and UE2 has another unicast ON duration 816, during which an indication of the multicast DRX ON duration 822, and/or other parameters related to the multicast DRX cycle or related resources, may be received for an associated multicast group identifier. Thus, UE1 and UE2 can determine the multicast ON duration 822 based on the control data received during respective unicast ON durations 814, 816, and can accordingly activate receiver resources during the multicast DRX ON duration 822 to receive multicast communications from the access point.

In an example, where UE 415 is in idle mode, resource indicating component 562 can indicate resources as related to the multicast group identifier in a single carrier (SC)-multicast control channel (MCCH) transmitted in a PDCCH. In an example, resource indicating component 562 can modify the SC-MCCH configuration by adding a multicast group identifier (e.g., G-RNTI), a multicast IP address mapping and/or a data coming indication for each group. In this example, resource determining component 512 can accordingly receive the SC-MCCH, which may include a change notification, indicating the G-RNTI. Based on receiving the notification, resource determining component 512 can switch to connected mode to monitor a PDCCH scheduling for the G-RNTI and follow the associated DRX configuration to receive multicast communications. In one example, resource indicating component 562 can indicate, and resource determining component 512 can receive, the SC-MCCH change notification in a system information block broadcast from the access point 405 and received by the UE 415 in idle mode.

Method 600 may optionally include, at Block 616, transmitting feedback information related to the multicast data. In an aspect, communicating component 361, e.g., in conjunction with processor(s) 502, memory 503, and/or transceiver 504, can transmit feedback information related to the multicast data, such as a CQI, HARQ acknowledgement (ACK)/negative-ACK (NACK), etc. In this regard, method 700 may optionally include, at Block 716, receiving feedback information related to the multicast data. In an aspect, scheduling component 302, e.g., in conjunction with processor(s) 552, memory 553, and/or transceiver 554, can receive the feedback information related to the multicast data, and can accordingly manage subsequent multicast data transmissions. For example, communicating component 361 can transmit CQI, and scheduling component 302 can monitor CQI for multiple UEs associated with a multicast group in scheduling transmission of multicast packets. In a specific example, scheduling component 302 may determine whether to use unicast or multicast transmission to transmit data based on a number of UEs associated with a multicast group. In another example, UEs can transmit HARQ feedback on uplink control channel (e.g., physical uplink control channel (PUCCH) in LTE) resources linked to the downlink control channel (e.g., PDCCH) used for group (e.g., multicast) PDSCH scheduling. A given UE may report NACK if it cannot decode a multicast transmission from the access point. In another example, the group NACK may not be reliable due to listen-before-talk or similar mechanisms configured to reduce interference when communicating in the unlicensed band (e.g., in LTE-U). This is because the group NACK may not be received within an expected period of time, and/or may not be received at all if communications between the UE 415 and access point 405 degrade to a certain point. Thus, a UE can thus send a group ACK on one PUCCH resource in addition to group NACK on another PUCCH resource, which can allow the access point 405 to detect the group ACK to ensure the communications have not degraded such that the group NACK may not be received.

In this regard, for example, scheduling component 302 may determine to retransmit one or more multicast communications based on HARQ feedback from one or more UEs. Thus, method 700 may optionally include, at Block 718, transmitting one or more retransmissions of the multicast data in contiguous or non-contiguous periods of time in a subsequent DRX ON duration. In an aspect, scheduling component 302, e.g., in conjunction with processor(s) 552, memory 553, and/or transceiver 554, can transmit the one or more retransmissions of the multicast data in contiguous or non-contiguous periods of time in the subsequent DRX ON duration. For example, scheduling component 302 may transmit retransmission of the multicast data back-to-back in a multicast DRX ON duration and/or contiguous DRX ON durations such that UEs do not need to increase HARQ buffer size for multicast reception. In another example, scheduling component 302 may transmit retransmission of multicast data in non-contiguous transmission opportunities (e.g., over one or more DRX ON durations) to achieve a time diversity. For example, access point 405 may configure UE 415 with the associated HARQ retransmissions scheme to allow UE 415 to appropriately receive retransmissions. In another example, scheduling component 302 can configure multicast communications in an unacknowledged mode (UM), where there may not be a need for PDCP reordering and report if there is no HARQ feedback. In another example, scheduling component 302 can add reordering and PDCP status reports related to multicast communications for upper layer feedback (e.g., in addition to NACK based feedback if HARQ is applied), and scheduling component 302 can retransmit packets based on the PDCP reports.

In an example, where feedback transmitted at Block 616 is NACK, method 600 may continue to Block 606 to receive additional multicast data over resources corresponding to the multicast communications. In an aspect, communicating component 361, e.g., in conjunction with processor(s) 502, memory 503, and/or transceiver 504, can receive additional multicast data over resources corresponding to the multicast communications, as described, which may include receiving one or more retransmissions of the multicast data (e.g., back-to-back, and/or non-contiguously, as described above).

Method 700 may also optionally include, at Block 720, periodically receiving and updating a security key for receiving multicast data. In an aspect, security key updating component 564, e.g., in conjunction with processor(s) 552, memory 553, and/or transceiver 554, can periodically receive, from a network component (e.g., MME 452) an updated security key for UE 415 and/or other UEs to access multicast data from access point 405. For example, MME 452 or other network components may update and communicate the security key to access point 405 according to a time period, based on detecting one or more events, and/or the like. In this regard, for example, security key updating component 564 can update the key for the UEs, which may include updating the security key used by scheduling component 302 to encode/encrypt the data before transmission. In addition, security key updating component 564 can communicate the updated security key to one or more UEs.

Thus, for example, method 600 may optionally include, at Block 618, periodically receiving and updating a security key for receiving multicast data. In an aspect, security key component 514, e.g., in conjunction with processor(s) 502, memory 503, and/or transceiver 504, can periodically receive and update the security key for receiving multicast data. For example, security key component 514 can receive the security key from the access point 405 (e.g., in a non-access stratum (NAS) layer message) and can use the security key in subsequently decoding/decrypting communications from the access point 405. An example is described with respect to FIG. 12 below.

Figure 9:
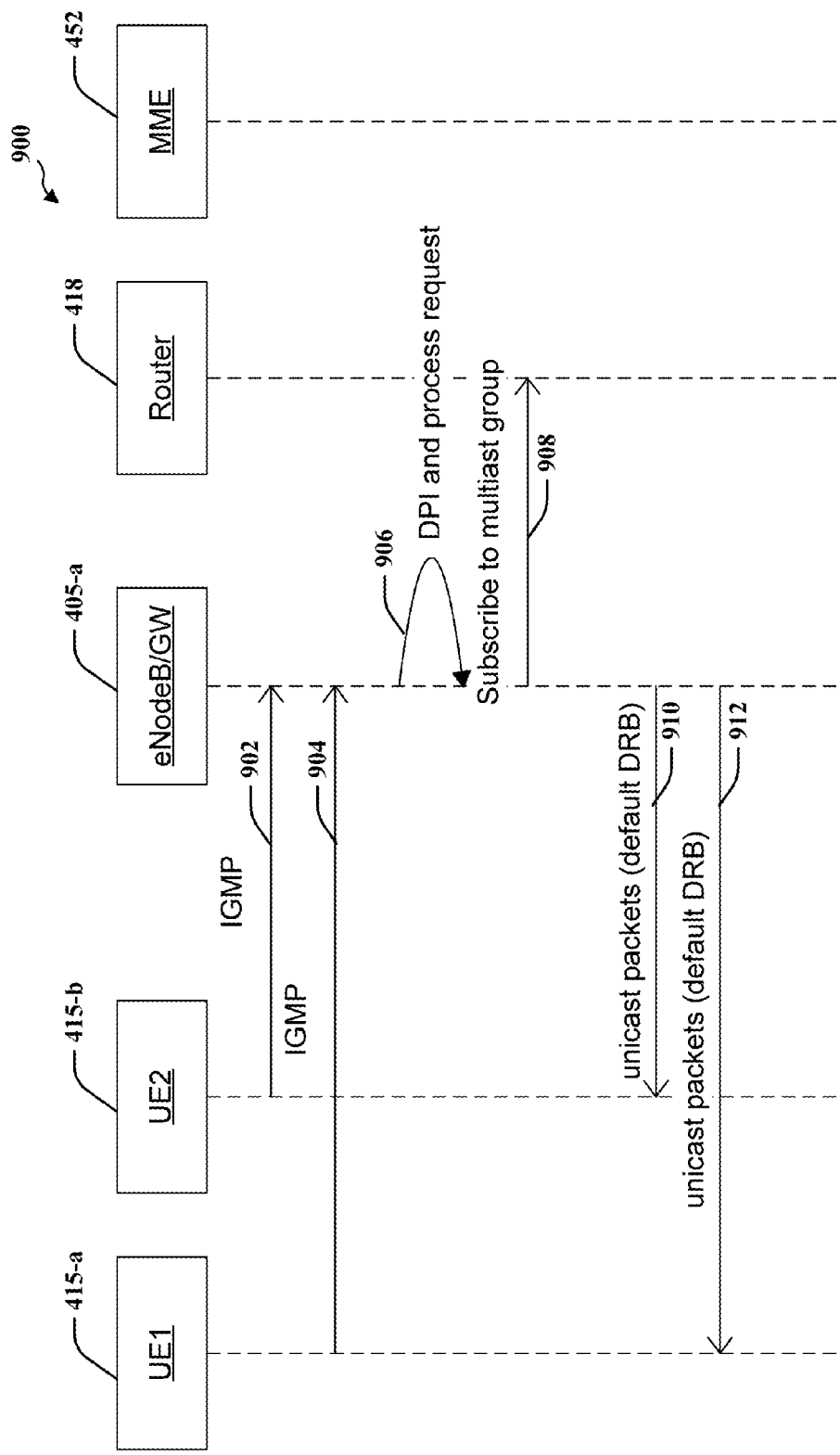
FIG. 9 illustrates an example of a system for transmitting multicast data in unicast packets in accordance with aspects described herein.

FIG. 9 illustrates an example of a system 900 for performing multicast communications using unicast resources in accordance with aspects described herein. System 900 includes UE1 415-*a* and UE2 415-*b* that communicate with an access point (eNodeB/GW) 405-*a* to receive access to a wireless network (e.g., via internet router 418). System 900 also includes an internet router 418 to provide access to an internet, and an MME 452 to facilitate bearer establishment, UE authentication, and/or other UE services or functions. In an example, UE1 415-*a* can transmit an IGMP message 902 to access point 405-*a* to request multicast data, as described herein, and UE2 415-*b* can also transmit an IGMP message 904 to access point 405-*a*. Access point 405-*a* can perform deep packet inspection (DPI) and process the requests 906 in the IGMP messages 902, 904. In this regard, access point 405-*a* can send a request to subscribe to a multicast group 908 to internet router 418 to receive multicast data for transmitting to UE1 415-*a* and UE2 415-*b*. Access point 405-*a* can then transmit the multicast data separately in unicast packets over a default DRB 910 to UE2 415-*b* and in unicast packets over a default DRB 912 to UE1 415-*a*.

Figure 10:
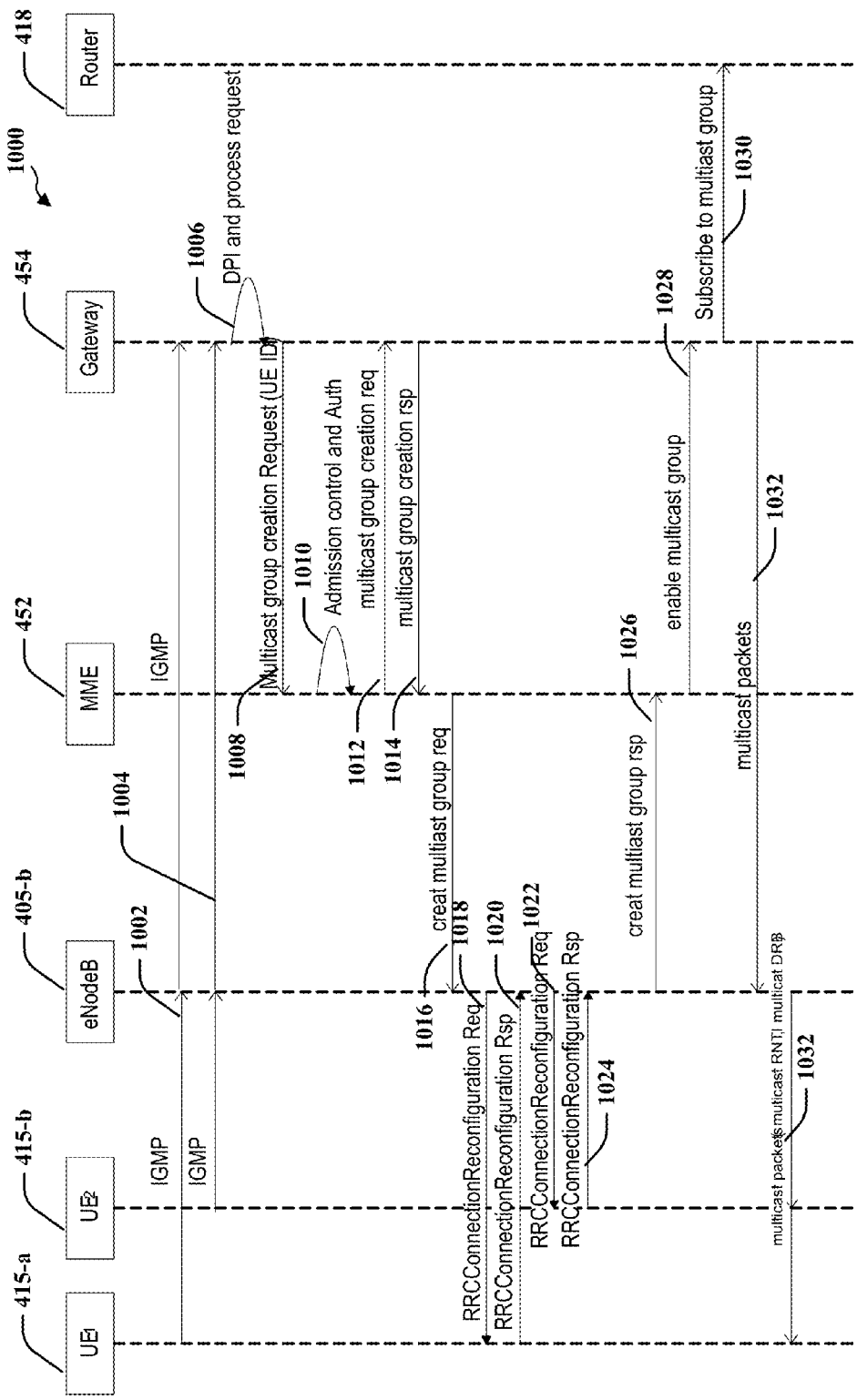
FIG. 10 illustrates an example of a system for transmitting multicast data in accordance with aspects described herein.

FIG. 10 illustrates an example of a system 1000 for performing multicast communications using a non-co-located eNodeB/GW in accordance with aspects described herein. System 1000 includes UE1 415-*a* and UE2 415-*b* that communicate with an access point (eNodeB) 405-*b* to receive access to a wireless network. System 1000 also includes an internet router 418 to provide access to an internet, an MME 452 to facilitate bearer establishment, UE authentication, and/or other UE services or functions, and a separate gateway (GW) 454 to facilitate UE access to internet router 418. In an example, UE1 415-*a* can transmit an IGMP message 1002 to access point 405-*b* to request multicast data, as described herein, and access point 405-*b* can transmit the IGMP message to gateway 454 to facilitate creation of a multicast group. UE2 415-*b* can also transmit an IGMP message 1004 to access point 405-*b* to request multicast data, as described herein, and access point 405-*b* can transmit the IGMP message to gateway 454 as well. Gateway 454 can perform DPI and process the request 1006, and can begin creating the multicast group, which may include transmitting a multicast group creation request 1008 to MME 452 along with an identifier of UE1 415-*a* to authenticate the UE, but may only need to do so for the request from UE1 415-*a* and not for UE2 415-*b* as the resources may be already allocated for IGMP message 1002 and UE2 415-*b* can be added to the group without allocation of new resources. MME 452 may perform admission control and authorization 1010 for the UE1 415-*a*. MME 452 can then request multicast group creation at the gateway 454 by transmitting a multicast group creation request 1012. Gateway 454 can complete creation of the multicast group, and can transmit a multicast group creation response 1014 to MME 452.

MME 452 can also send a create multicast group request 1016 to the access point 405-*b* to confirm creation of the multicast group. Access point 405-*b* can accordingly create a new DRB with UE1 415-*a* by transmitting an RRCConnectionReconfiguration Req 1018 thereto, and receiving a RRCConnectionReconfiguration Rsp 1020 therefrom. Access point 405-*b* can similarly create a new DRB with UE2 415-*b* by transmitting an RRCConnectionReconfiguration Req 1022 thereto, and receiving a RRCConnectionReconfiguration Rsp 1024 therefrom. Access point 405-*b* can accordingly transmit a create multicast group response 1026 to MME 452 to indicate establishment of bearers for the multicast group. MME can enable the multicast group by transmitting an enable multicast group message 1028 to gateway 454. Gateway 454 can accordingly send a request to subscribe to a multicast group 1030 to internet router 418 to receive multicast data. Gateway 454 can begin forwarding multicast packets 1032 to access point 405-*b*, which can transmit the multicast packets 1032 with a multicast group identifier (e.g., G-RNTI) over the established DRBs.

Figure 11:
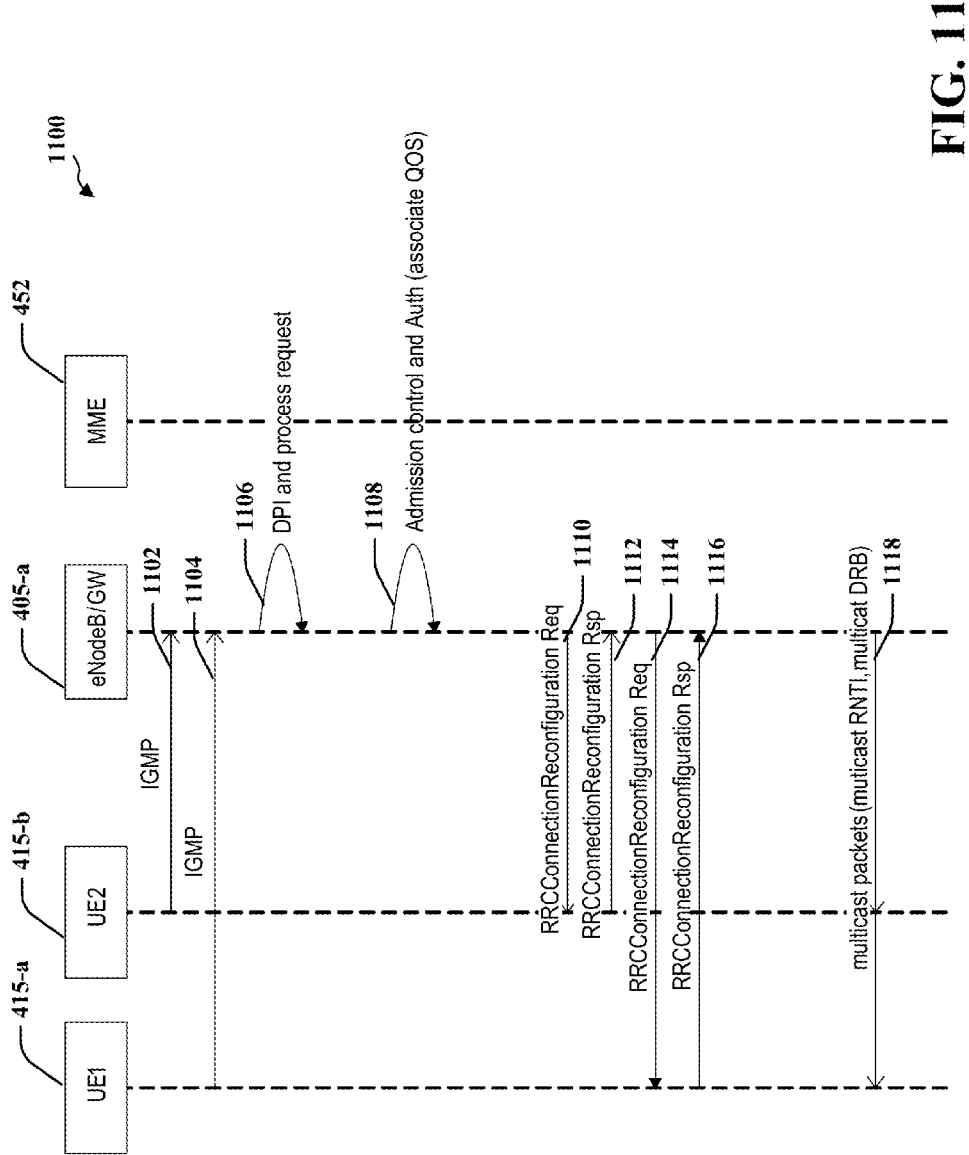
FIG. 11 illustrates an example of a system for transmitting multicast data in accordance with aspects described herein.

FIG. 11 illustrates an example of a system 1100 for performing multicast communications using a co-located eNodeB/GW in accordance with aspects described herein. System 1100 includes UE1 415-*a* and UE2 415-*b* that communicate with an access point (eNodeB/GW) 405-*a* to receive access to a wireless network. System 1100 also includes an MME 452 to facilitate bearer establishment, UE authentication, and/or other UE services or functions. In an example, UE1 415-*a* can transmit an IGMP message 1102 to access point 405-*a* to request multicast data, as described herein, and UE2 415-*b* can also transmit an IGMP message 1104 to access point 405-*a*. Access point 405-*a* can perform DPI and process the request 1106, and can perform admission control and authorization 1108 for the UEs, which may also include associating a quality-of-service (QoS). Access point 405-*a* can accordingly create a new DRB with UE2 415-*b* by transmitting an RRCConnectionReconfiguration Req 1110 thereto, and receiving a RRCConnectionReconfiguration Rsp 1112 therefrom. Access point 405-*a* can similarly create a new DRB with UE1 415-*a* by transmitting an RRCConnectionReconfiguration Req 1114 thereto, and receiving a RRCConnectionReconfiguration Rsp 1116 therefrom. Access point 405-*a* can accordingly transmit the multicast packets 1118 with a multicast group identifier (e.g., G-RNTI) over the established DRBs.

Figure 12:
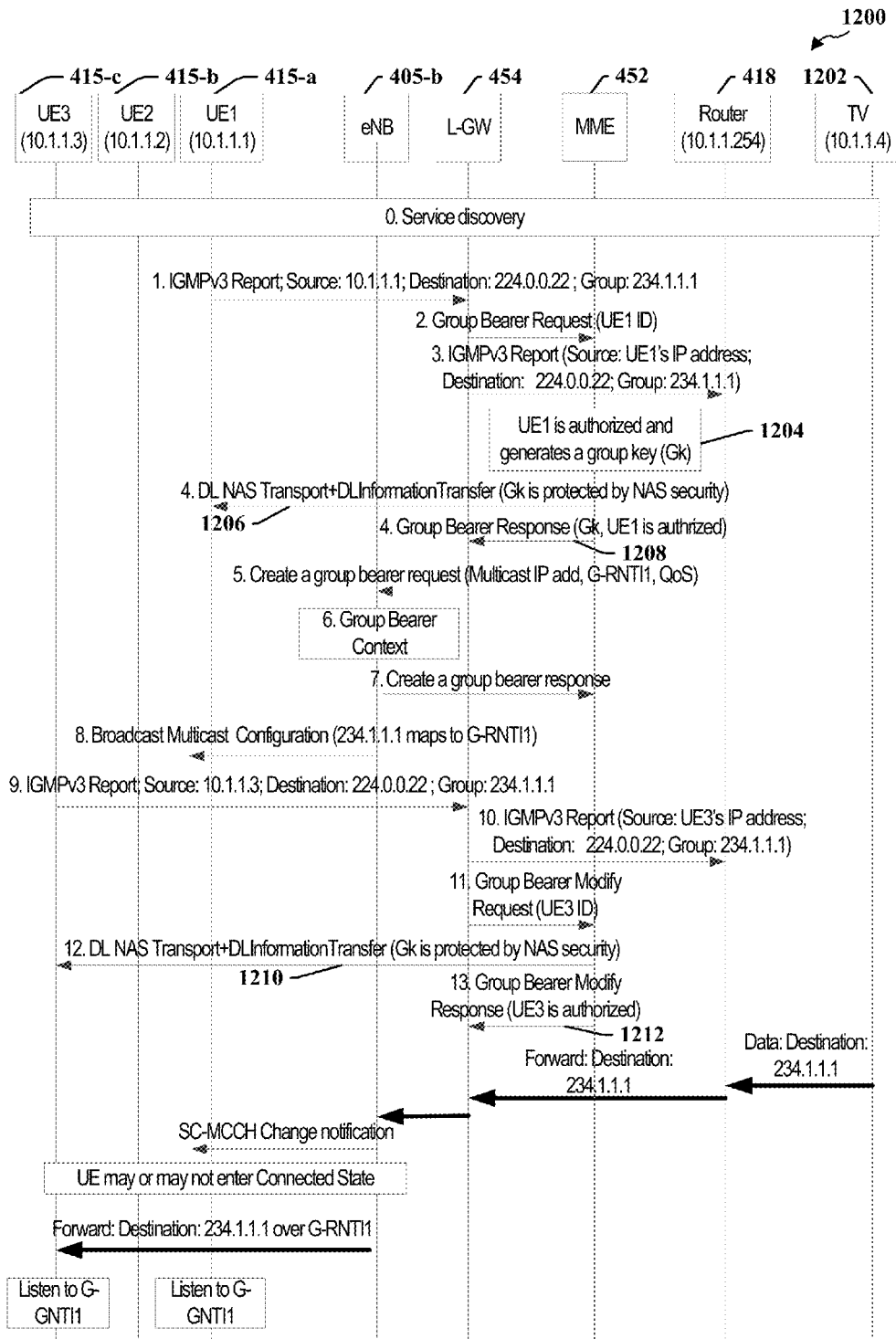
FIG. 12 illustrates an example of a system for transmitting multicast data and security parameters in accordance with aspects described herein.

FIG. 12 illustrates an example of a system 1200 for performing multicast communications using a non-co-located eNodeB/GW in accordance with aspects described herein. System 1000 includes UE1 415-*a*, UE2 415-*b*, and UE3 415-*c* that communicate with an access point (eNodeB) 405-*b* to receive access to a wireless network. System 1000 also includes an internet router 418 to provide access to an internet, an MME 452 to facilitate bearer establishment, UE authentication, and/or other UE services or functions, and a separate LGW 454 to facilitate UE access to internet router 418. System 1200 further includes a TV 1202 media source that generates media data for multicasting. UEs 415-*a*, 415-*b*, 415-*c* can perform service discovery of media services offered by TV 1202. UE1 415-*a* can accordingly transmit a IGMP report to LGW 454 (via access point 405-*b*) indicating a source, destination, and group address. Thus, for example, access point 405-*b* and/or other network components can monitor for IGMP requests from the UEs for registration (and/or deregistration) of multicast groups. LGW 454 can transmit a group bearer request to MME 452, and can forward the IGMP request to internet router 418. LGW 454, access point 405-*b* or another entity may also associate a priority and/or quality control index (QCI) to the group bearer. MME 452 can authorize the UE1 415-*a* and generate a group key, Gk, at 1204. MME 452 can then communicate Gk to UE1 415-*a* via LGW 454, where LGW 454 can encrypt communications using the group key, and access point 405-*b* in a NAS transport message 1206. In an example, NAS layer security can be used to protect Gk in sending to the UE 415. MME 452 can also transmit a group bearer response 1208 to the LGW 454 indicating the UE1 is authorized to receive multicast communications.

MME 452 can transmit a create group bearer request to the access point 405-*b*, which can create a group bearer context for multicast communications, and can transmit a create group bearer response back to MME 452. In addition, access point 405-*b* can transmit one or more parameters regarding a multicast configuration, as described, such as a G-RNTI. UEs 415-*a*, 415-*b*, and/or 415-*c* may receive the one or more parameters from the access point 405-*b* (e.g., in system information, control channel communications, etc.), and may attempt to receive multicast communications from access point 405-*a*. UE3 415-*c* may also transmit an IGMP report to LGW 454 to request the multicast communications. LGW 454 can similarly forward the IGMP report to internet router 418, and a group bearer modify request to MME 452 to request authorization for UE3 415-*c*. MME 452 can authorize UE3 415-*c* and can transmit Gk to the UE3 415-*c* in a NAS transport message 1210. MME 452 can also transmit a group bearer modify response 1212 to LGW 454 indicating that the UE3 415-*c* is authorized.

TV 1202 can transmit media data to internet router 418, which can forward the data to LGW 454. LGW 454 can forward the media data to access point 405-*b*. This can occur using a TEID for the multicast data to tunnel the data to access point 405-*b*. Access point 405-*b* can associate the TEID with a multicast group identifier, in one example as described. Access point 405-*b* may transmit a SC-MCCH change notification to indicate that the media data is available and is to be multicast. UEs 415-*a*, 415-*b*, and/or 415-*c*, if in an idle mode, can transition to a connected mode based on receiving the SC-MCCH change notification. In any case, access point 405-*b* can transmit the media data over multicast resources, and at least UE1 415-*a* and/or UE3 415-*c* can receive and decode the communications (e.g., using Gk). As described, for example, UE1 415-*a* and/or UE3 415-*c* may determine the multicast resources based on monitoring one or more control channels for the associated G-RNTI.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for communicating using multicast in a wireless network, comprising:
    establishing a connection with an access point using a cellular radio access technology;
    configuring, with the access point, a unicast discontinuous receive cycle for receiving unicast communications from the access point;

transmitting, to the access point over the connection, an internet protocol request for multicast communications; and receiving, from the access point and based on the internet protocol request, multicast data over resources corresponding to over-the-air multicast communications, wherein receiving the multicast data over the resources comprises receiving the multicast data in at least a portion of an ON duration of a multicast discontinuous receive cycle, wherein the multicast discontinuous receive cycle is configured by the access point to at least partially overlap the unicast discontinuous receive cycle.

2. The method of claim 1, wherein the internet protocol request is an internet group management protocol (IGMP) request.

3. The method of claim 1, further comprising receiving a multicast group identifier from the access point.

4. The method of claim 3, wherein receiving the multicast group identifier from the access point is in response to the internet protocol request.

5. The method of claim 3, wherein receiving the multicast group identifier from the access point is in a system information broadcast by the access point.

6. The method of claim 3, further comprising determining the resources corresponding to the multicast communications based at least in part on the multicast group identifier.

7. The method of claim 6, wherein determining the resources comprises monitoring a control channel based at least in part on the multicast group identifier during an ON duration of the unicast discontinuous receive cycle.

8. The method of claim 7, wherein receiving the multicast data over the resources occurs during a different ON duration of the multicast discontinuous receive cycle.

9. The method of claim 6, wherein determining the resources comprises determining the resources based on an ON duration of the multicast discontinuous receive cycle indicated for the multicast group identifier in a control channel from the access point.

10. The method of claim 6, wherein determining the resources comprises determining the resources from a discontinuous receive cycle configuration received from the access point in system information or a multicast control channel.

11. The method of claim 1, further comprising sending a negative-acknowledgement to the access point where decoding the multicast data fails.

12. The method of claim 1, further comprising sending a negative-acknowledgement to the access point for the multicast data over a first control channel and sending an acknowledgement to the access point for the multicast data over a second control channel.

13. The method of claim 1, further comprising periodically receiving a security key for receiving multicast data from the access point, and utilizing the security key to decode the multicast data.

14. An apparatus for communicating using multicast in a wireless network, comprising:

a transceiver for communicating one or more wireless signals via one or more antennas;

a memory configured to store instructions; and at least one processor communicatively coupled with the transceiver and the memory, wherein the at least one processor is configured to:

establish a connection with an access point using a cellular radio access technology;

configure, with the access point, a unicast discontinuous receive cycle for receiving unicast communications from the access point;

transmit, to the access point over the connection, an internet protocol request for multicast communications; and receive, from the access point and based on the internet protocol request, multicast data over resources corresponding to over-the-air multicast communications, wherein the at least one processor is configured to receive the multicast data in at least a portion of an ON duration of a multicast discontinuous receive cycle, wherein the multicast discontinuous receive cycle is configured by the access point to at least partially overlap the unicast discontinuous receive cycle.

15. The apparatus of claim 14, wherein the internet protocol request is an internet group management protocol (IGMP) request.

16. The apparatus of claim 14, wherein the at least one processor is further configured to receive a multicast group identifier from the access point.

17. The apparatus of claim 16, wherein the at least one processor is configured to receive the multicast group identifier from the access point in response to the internet protocol request.

18. The apparatus of claim 16, wherein the at least one processor is configured to receive the multicast group identifier from the access point in a system information broadcast by the access point.

19. The apparatus of claim 16, wherein the at least one processor is further configured to determine the resources corresponding to the multicast communications based at least in part on the multicast group identifier.

20. The apparatus of claim 19, wherein the at least one processor is configured to determine the resources at least in part by monitoring a control channel based at least in part on the multicast group identifier during an ON duration of the unicast discontinuous receive cycle.

21. The apparatus of claim 20, wherein the at least one processor is configured to receive the multicast data over the resources occurs during a different ON duration of the multicast discontinuous receive cycle.

22. The apparatus of claim 19, wherein the at least one processor is configured to determine the resources based on an ON duration of the multicast discontinuous receive cycle indicated for the multicast group identifier in a control channel from the access point.

23. The apparatus of claim 19, wherein the at least one processor is configured to determine the resources from a discontinuous receive cycle configuration received from the access point in system information or a multicast control channel.

24. The apparatus of claim 14, wherein the at least one processor is further configured to send a negative-acknowledgement to the access point where decoding the multicast data fails.

25. The apparatus of claim 14, wherein the at least one processor is further configured to send a negative-acknowledgement to the access point for the multicast data over a first control channel and send an acknowledgement to the access point for the multicast data over a second control channel.

26. The apparatus of claim 14, wherein the at least one processor is configured to periodically receive a security key for receiving multicast data from the access point, and utilize the security key to decode the multicast data.

27. An apparatus for communicating using multicast in a wireless network, comprising:
 means for establishing a connection with an access point using a cellular radio access technology;
 means for configuring, with the access point, a unicast discontinuous receive cycle for receiving unicast communications from the access point;
 means for transmitting, to the access point over the connection, an internet protocol request for multicast communications; and
 means for receiving, from the access point and based on the internet protocol request, multicast data over resources corresponding to over-the-air multicast communications,
 wherein the means for receiving the multicast data over the resources comprises receives the multicast data in at least a portion of an ON duration of a multicast discontinuous receive cycle, wherein the multicast discontinuous receive cycle is configured by the access point to at least partially overlap the unicast discontinuous receive cycle.

28. The apparatus of claim 27, wherein the internet protocol request is an internet group management protocol (IGMP) request.

29. The apparatus of claim 27, further comprising means for receiving a multicast group identifier from the access point.

30. The apparatus of claim 29, wherein the means for receiving the multicast group identifier from the access point receives in response to the internet protocol request.

31. The apparatus of claim 29, wherein means for receiving the multicast group identifier from the access point receives in a system information broadcast by the access point.

32. The apparatus of claim 29, further comprising means for determining the resources corresponding to the multicast communications based at least in part on the multicast group identifier.

33. The apparatus of claim 32, wherein the means for determining the resources monitors a control channel based at least in part on the multicast group identifier during an ON duration of the unicast discontinuous receive cycle.

34. The apparatus of claim 33, wherein the means for receiving the multicast data over the resources receives during a different ON duration of the multicast discontinuous receive cycle.

35. The apparatus of claim 32, wherein the means for determining the resources determines the resources based on an ON duration of the multicast discontinuous receive cycle indicated for the multicast group identifier in a control channel from the access point.

36. The apparatus of claim 32, wherein means for determining the resources determines the resources from a discontinuous receive cycle configuration received from the access point in system information or a multicast control channel.

37. The apparatus of claim 27, further comprising means for sending a negative-acknowledgement to the access point where decoding the multicast data fails.

38. The apparatus of claim 27, further comprising means for sending a negative-acknowledgement to the access point for the multicast data over a first control channel and sending an acknowledgement to the access point for the multicast data over a second control channel.

39. The apparatus of claim 27, further comprising means for periodically receiving a security key for receiving multicast data from the access point, and utilizing the security key to decode the multicast data.

40. A non-transitory computer-readable storage medium comprising computer-executable code for communicating using multicast in a wireless network, the code comprising:
 code for establishing a connection with an access point using a cellular radio access technology;
 code for configuring, with the access point, a unicast discontinuous receive cycle for receiving unicast communications from the access point;
 code for transmitting, to the access point over the connection, an internet protocol request for multicast communications; and
 code for receiving, from the access point and based on the internet protocol request, multicast data over resources corresponding to over-the-air multicast communications,
 wherein the code for receiving the multicast data over the resources comprises receives the multicast data in at least a portion of an ON duration of a multicast discontinuous receive cycle, wherein the multicast discontinuous receive cycle is configured by the access point to at least partially overlap the unicast discontinuous receive cycle.

41. The non-transitory computer-readable storage medium of claim 40, wherein the internet protocol request is an internet group management protocol (IGMP) request.

42. The non-transitory computer-readable storage medium of claim 40, further comprising code for receiving a multicast group identifier from the access point.

43. The non-transitory computer-readable storage medium of claim 42, wherein the code for receiving the multicast group identifier from the access point receives in response to the internet protocol request.

44. The non-transitory computer-readable storage medium of claim 42, wherein code for receiving the multicast group identifier from the access point receives in a system information broadcast by the access point.

45. The non-transitory computer-readable storage medium of claim 42, further comprising code for determining the resources corresponding to the multicast communications based at least in part on the multicast group identifier.

46. The non-transitory computer-readable storage medium of claim 45, wherein the code for determining the resources monitors a control channel based at least in part on the multicast group identifier during an ON duration of the unicast discontinuous receive cycle.

47. The non-transitory computer-readable storage medium of claim 46, wherein the code for receiving the multicast data over the resources receives during a different ON duration of the multicast discontinuous receive cycle.

48. The non-transitory computer-readable storage medium of claim 45, wherein the code for determining the resources determines the resources based on an ON duration of the multicast discontinuous receive cycle indicated for the multicast group identifier in a control channel from the access point.

49. The non-transitory computer-readable storage medium of claim 45, wherein code for determining the resources determines the resources from a discontinuous receive cycle configuration received from the access point in system information or a multicast control channel.

50. The non-transitory computer-readable storage medium of claim 40, further comprising code for sending a negative-acknowledgement to the access point where decoding the multicast data fails.

51. The non-transitory computer-readable storage medium of claim 40, further comprising code for sending a negative-acknowledgement to the access point for the multicast data over a first control channel and sending an acknowledgement to the access point for the multicast data over a second control channel.

52. The non-transitory computer-readable storage medium of claim 40, further comprising code for periodically receiving a security key for receiving multicast data from the access point, and utilizing the security key to decode the multicast data.

53. A method for communicating using multicast in a wireless network, comprising:
establishing a connection with a user equipment (UE) using a cellular radio access technology;
configuring, with the UE, a unicast discontinuous receive cycle for transmitting unicast communications to the UE;
receiving, from the UE over the connection, an internet protocol request from multicast communications;
configuring a multicast discontinuous receive cycle, that at least partially overlaps both of the unicast discontinuous receive cycle and a second unicast discontinuous receive cycle associated with one or more other UEs, for transmitting multicast communications to the UE and the one or more other UEs; and
transmitting, to the UE and one or more other UEs during an ON duration of the multicast discontinuous receive cycle and based on the internet protocol request, multicast data over resources corresponding to over-the-air multicast communications.

54. The method of claim 53, wherein the internet protocol request is an internet group management protocol (IGMP) request.

55. The method of claim 53, further comprising communicating a multicast group identifier to the UE.

56. The method of claim 55, wherein communicating the multicast group identifier to the UE is in response to the internet protocol request.

57. The method of claim 55, wherein communicating the multicast group identifier to the UE comprises broadcasting system information including the multicast group identifier.

58. The method of claim 55, wherein transmitting the multicast data is based at least in part on the multicast group identifier.

59. The method of claim 58, further comprising indicating the resources as related to the multicast group identifier in a control channel transmitted in an ON duration of the unicast discontinuous receive cycle.

60. The method of claim 58, further comprising indicating the resources as related to the multicast group identifier in a control channel transmitted in the ON duration of the multicast discontinuous receive cycle.

61. The method of claim 58, further comprising associating multiple multicast groups of UEs with the multicast group identifier.

62. The method of claim 58, further comprising adding the multicast group identifier to a multicast control channel configuration communicated to the UE, wherein transmitting the multicast data is based at least in part on adding the multicast group identifier to the multicast control channel configuration.

63. The method of claim 53, further comprising indicating a group discontinuous receive configuration in system information or in a multicast control channel.

64. The method of claim 53, further comprising monitoring channel quality indicator (CQI) feedback transmitted by the UE and the one or more other UEs to schedule transmission of the multicast data.

65. The method of claim 53, further comprising receiving a negative-acknowledgement from the UE for the multicast data over a first control channel and receiving an acknowledgement from the UE for the multicast data over a second control channel.

66. The method of claim 53, further comprising transmitting retransmissions of the multicast data in contiguous periods of time in a subsequent ON duration from transmitting the multicast data.

67. The method of claim 53, further comprising transmitting retransmissions of the multicast data in non-contiguous periods of time in a subsequent ON duration from transmitting the multicast data.

68. The method of claim 53, further comprising periodically receiving a security key for one or more UEs in a group receive the multicast data, and communicating the security key to the one or more UEs.

69. An apparatus for communicating using multicast in a wireless network, comprising:
a transceiver for communicating one or more wireless signals via one or more antennas;
a memory configured to store instructions; and
at least one processor communicatively coupled with the transceiver and the memory, wherein the at least one processor is configured to:
establish a connection with a user equipment (UE) using a cellular radio access technology;
configure, with the UE, a unicast discontinuous receive cycle for transmitting unicast communications to the UE;
receive, from the UE over the connection, an internet protocol request from multicast communications;
configure a multicast discontinuous receive cycle, that at least partially overlaps both of the unicast discontinuous receive cycle and a second unicast discontinuous receive cycle associated with one or more other UEs, for transmitting multicast communications to the UE and the one or more other UEs; and
transmit, to the UE and one or more other UEs during an ON duration of the multicast discontinuous receive cycle and based on the internet protocol request, multicast data over resources corresponding to over-the-air multicast communications.

70. The apparatus of claim 69, wherein the internet protocol request is an internet group management protocol (IGMP) request.

71. The apparatus of claim 69, wherein the at least one processor is further configured to communicate a multicast group identifier to the UE.

72. The apparatus of claim 71, wherein the at least one processor is configured to communicate the multicast group identifier to the UE in response to the internet protocol request.

73. The apparatus of claim 71, wherein the at least one processor is configured to communicate the multicast group identifier to the UE at least in part by broadcasting system information including the multicast group identifier.

74. The apparatus of claim 71, wherein the at least one processor is configured to transmit the multicast data based at least in part on the multicast group identifier.

75. The apparatus of claim 74, wherein the at least one processor is further configured to indicate the resources as related to the multicast group identifier in a control channel transmitted in an ON duration of the unicast discontinuous receive cycle.

76. The apparatus of claim 74, wherein the at least one processor is further configured to indicate the resources as related to the multicast group identifier in a control channel transmitted in the ON duration of the multicast discontinuous receive cycle.

77. The apparatus of claim 75, wherein the at least one processor is further configured to associate multiple multicast groups of UEs with the multicast group identifier.

78. The apparatus of claim 75, wherein the at least one processor is further configured to add the multicast group identifier to a multicast control channel configuration communicated to the UE, wherein the at least one processor is configured to transmit the multicast data based at least in part on adding the multicast group identifier to the multicast control channel configuration.

79. The apparatus of claim 69, wherein the at least one processor is further configured to indicate a group discontinuous receive configuration in system information or in a multicast control channel.

80. The apparatus of claim 69, wherein the at least one processor is further configured to monitor channel quality indicator (CQI) feedback transmitted by the UE and the one or more other UEs to schedule transmission of the multicast data.

81. The apparatus of claim 69, wherein the at least one processor is further configured to receive a negative-acknowledgement from the UE for the multicast data over a first control channel and receive an acknowledgement from the UE for the multicast data over a second control channel.

82. The apparatus of claim 69, wherein the at least one processor is further configured to transmit retransmissions of the multicast data in contiguous periods of time in a subsequent ON duration from transmitting the multicast data.

83. The apparatus of claim 69, wherein the at least one processor is further configured to transmit retransmissions of the multicast data in non-contiguous periods of time in a subsequent ON duration from transmitting the multicast data.

84. The apparatus of claim 69, wherein the at least one processor is further configured to periodically receive a security key for one or more UEs in a group receive the multicast data, and communicate the security key to the one or more UEs.

85. An apparatus for communicating using multicast in a wireless network, comprising:
　　means for establishing a connection with a user equipment (UE) using a cellular radio access technology;
　　means for configuring, with the UE, a unicast discontinuous receive cycle for transmitting unicast communications to the UE;
　　means for receiving, from the UE over the connection, an internet protocol request from multicast communications;
　　means for configuring a multicast discontinuous receive cycle, that at least partially overlaps both of the unicast discontinuous receive cycle and a second unicast discontinuous receive cycle associated with one or more other UEs, for transmitting multicast communications to the UE and the one or more other UEs; and
　　means for transmitting, to the UE and one or more other UEs during an ON duration of the multicast discontinuous receive cycle and based on the internet protocol request, multicast data over resources corresponding to over-the-air multicast communications.

86. The apparatus of claim 85, wherein the internet protocol request is an internet group management protocol (IGMP) request.

87. The apparatus of claim 85, further comprising means for communicating a multicast group identifier to the UE.

88. The apparatus of claim 87, wherein the means for communicating the multicast group identifier to the UE communicates in response to the internet protocol request.

89. The apparatus of claim 87, wherein the means for communicating the multicast group identifier to the UE broadcasts system information including the multicast group identifier.

90. The apparatus of claim 87, wherein the means for transmitting the multicast data transmits based at least in part on the multicast group identifier.

91. The apparatus of claim 90, further comprising means for indicating the resources as related to the multicast group identifier in a control channel transmitted in an ON duration of the unicast discontinuous receive cycle.

92. The apparatus of claim 90, further comprising means for indicating the resources as related to the multicast group identifier in a control channel transmitted in the ON duration of the multicast discontinuous receive cycle.

93. The apparatus of claim 90, further comprising means for associating multiple multicast groups of UEs with the multicast group identifier.

94. The apparatus of claim 90, further comprising means for adding the multicast group identifier to a multicast control channel configuration communicated to the UE, wherein the means for transmitting the multicast data transmits based at least in part on adding the multicast group identifier to the multicast control channel configuration.

95. The apparatus of claim 85, further comprising means for indicating a group discontinuous receive configuration in system information or in a multicast control channel.

96. The apparatus of claim 85, further comprising means for monitoring channel quality indicator (CQI) feedback transmitted by the UE and the one or more other UEs to schedule transmission of the multicast data.

97. The apparatus of claim 85, further comprising means for receiving a negative-acknowledgement from the UE for the multicast data over a first control channel and receiving an acknowledgement from the UE for the multicast data over a second control channel.

98. The apparatus of claim 85, further comprising means for transmitting retransmissions of the multicast data in contiguous periods of time in a subsequent ON duration from transmitting the multicast data.

99. The apparatus of claim 85, further comprising means for transmitting retransmissions of the multicast data in non-contiguous periods of time in a subsequent ON duration from transmitting the multicast data.

100. The apparatus of claim 85, further comprising means for periodically receiving a security key for one or more UEs in a group receive the multicast data, and communicating the security key to the one or more UEs.

101. A non-transitory computer-readable storage medium comprising computer-executable code for communicating using multicast in a wireless network, the code comprising:
　　code for establishing a connection with a user equipment (UE) using a cellular radio access technology;
　　code for configuring, with the UE, a unicast discontinuous receive cycle for transmitting unicast communications to the UE;

code for receiving, from the UE over the connection, an internet protocol request from multicast communications;

code for configuring a multicast discontinuous receive cycle, that at least partially overlaps both of the unicast discontinuous receive cycle and a second unicast discontinuous receive cycle associated with one or more other UEs, for transmitting multicast communications to the UE and the one or more other UEs; and code for transmitting, to the UE and one or more other UEs during an ON duration of the multicast discontinuous receive cycle and based on the internet protocol request, multicast data over resources corresponding to over-the-air multicast communications.

102. The non-transitory computer-readable storage medium of claim 101, wherein the internet protocol request is an internet group management protocol (IGMP) request.

103. The non-transitory computer-readable storage medium of claim 101, further comprising code for communicating a multicast group identifier to the UE.

104. The non-transitory computer-readable storage medium of claim 103, wherein the code for communicating the multicast group identifier to the UE communicates in response to the internet protocol request.

105. The non-transitory computer-readable storage medium of claim 103, wherein the code for communicating the multicast group identifier to the UE broadcasts system information including the multicast group identifier.

106. The non-transitory computer-readable storage medium of claim 103, wherein the code for transmitting the multicast data transmits based at least in part on the multicast group identifier.

107. The non-transitory computer-readable storage medium of claim 106, further comprising code for indicating the resources as related to the multicast group identifier in a control channel transmitted in an ON duration of the unicast discontinuous receive cycle.

108. The non-transitory computer-readable storage medium of claim 106, further comprising code for indicating the resources as related to the multicast group identifier in a control channel transmitted in the ON duration of the multicast discontinuous receive cycle.

109. The non-transitory computer-readable storage medium of claim 106, further comprising code for associating multiple multicast groups of UEs with the multicast group identifier.

110. The non-transitory computer-readable storage medium of claim 106, further comprising code for adding the multicast group identifier to a multicast control channel configuration communicated to the UE, wherein the code for transmitting the multicast data transmits based at least in part on adding the multicast group identifier to the multicast control channel configuration.

111. The non-transitory computer-readable storage medium of claim 101, further comprising code for indicating a group discontinuous receive configuration in system information or in a multicast control channel.

112. The non-transitory computer-readable storage medium of claim 101, further comprising code for monitoring channel quality indicator (CQI) feedback transmitted by the UE and the one or more other UEs to schedule transmission of the multicast data.

113. The non-transitory computer-readable storage medium of claim 101, further comprising code for receiving a negative-acknowledgement from the UE for the multicast data over a first control channel and receiving an acknowledgement from the UE for the multicast data over a second control channel.

114. The non-transitory computer-readable storage medium of claim 101, further comprising code for transmitting retransmissions of the multicast data in contiguous periods of time in a subsequent ON duration from transmitting the multicast data.

115. The non-transitory computer-readable storage medium of claim 101, further comprising code for transmitting retransmissions of the multicast data in non-contiguous periods of time in a subsequent ON duration from transmitting the multicast data.

116. The non-transitory computer-readable storage medium of claim 101, further comprising code for periodically receiving a security key for one or more UEs in a group receive the multicast data, and communicating the security key to the one or more UEs.

* * * * *